US009684591B2

(12) United States Patent
Uehara et al.

(10) Patent No.: US 9,684,591 B2
(45) Date of Patent: *Jun. 20, 2017

(54) STORAGE SYSTEM AND STORAGE APPARATUS

(75) Inventors: Go Uehara, Odawara (JP); Shigeo Homma, Odawara (JP); Yoshiyuki Noborikawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1160 days.

This patent is subject to a terminal disclaimer.

(21) Appl. No.: 13/519,721

(22) PCT Filed: Apr. 27, 2012

(86) PCT No.: PCT/JP2012/002937
§ 371 (c)(1),
(2), (4) Date: Jun. 28, 2012

(87) PCT Pub. No.: WO2013/160972
PCT Pub. Date: Oct. 31, 2013

(65) Prior Publication Data
US 2013/0290629 A1 Oct. 31, 2013

(51) Int. Cl.
G06F 13/00 (2006.01)
G06F 12/02 (2006.01)
(Continued)

(52) U.S. Cl.
CPC ........ *G06F 12/0246* (2013.01); *G06F 3/0688* (2013.01); *G06F 11/108* (2013.01); *G06F 2211/1059* (2013.01)

(58) Field of Classification Search
CPC .......... G06F 11/00; G06F 11/10; G06F 12/00; G06F 12/06; G06F 13/00
See application file for complete search history.

(56) References Cited

U.S. PATENT DOCUMENTS 5,191,584 A   3/1993 Anderson
5,583,876 A * 12/1996 Kakuta ........................ 714/766
(Continued)

FOREIGN PATENT DOCUMENTS

JP   7-261946 A   10/1995
JP   2012-68862 A   4/2012
(Continued)

OTHER PUBLICATIONS

PCT International Search Report and Written Opinion on application PCT/JP2012/002937 mailed Oct. 17, 2012; 13 pages.
(Continued)

*Primary Examiner* — Charles Rones
*Assistant Examiner* — Han Doan
(74) *Attorney, Agent, or Firm* — Mattingly & Malur, PC

(57) ABSTRACT

A storage system comprises a first controller and a plurality of storage devices. The plurality of storage devices configure RAID, each of which includes one or more non-volatile memory chips providing storage space where data from a host computer is stored, and a second controller coupled to the non-volatile memory chips. In case where the first controller receives an update request to update first data to second data from the host computer, the second controller in a first storage device of the storage devices is configured to store the second data in an area different from an area where the first data has been stored, in the storage space of the first storage device; generate information that relates the first data and the second data; and generate an intermediate parity based on the first and the second data.

15 Claims, 44 Drawing Sheets

(51) Int. Cl.
*G06F 3/06* (2006.01)
*G06F 11/10* (2006.01)

(56) References Cited

U.S. PATENT DOCUMENTS

| | | | |
|---|---|---|---|
| 5,875,460 | A | 2/1999 | Kojima et al. |
| 5,958,078 | A * | 9/1999 | Yamamoto et al. .......... 714/766 |
| 6,098,191 | A | 8/2000 | Yamamoto et al. |
| 6,473,867 | B2 | 10/2002 | Yamamoto et al. |
| 6,665,773 | B1 | 12/2003 | McCombs |
| 7,831,768 | B2 | 11/2010 | Ananthamurthy et al. |
| 8,151,060 | B2 | 4/2012 | Mizushima |
| 8,700,975 | B2 | 4/2014 | Yoshihara |
| 2001/0013103 | A1* | 8/2001 | Yamamoto et al. .............. 714/6 |
| 2002/0007469 | A1 | 1/2002 | Taketa et al. |
| 2003/0061441 | A1* | 3/2003 | Yamamoto et al. .......... 711/114 |
| 2006/0282700 | A1 | 12/2006 | Cavallo |
| 2011/0208995 | A1* | 8/2011 | Hafner ................ G06F 11/1076 714/6.24 |
| 2011/0238885 | A1 | 9/2011 | Kitahara et al. |
| 2012/0072680 | A1 | 3/2012 | Kimura et al. |
| 2013/0219248 | A1 | 8/2013 | Sakurai |

FOREIGN PATENT DOCUMENTS

| | | | |
|---|---|---|---|
| WO | WO 2010/137178 A1 | 12/2010 | |
| WO | WO 2010137178 A1 * | 12/2010 | .............. G06F 11/10 |
| WO | 2012/053085 A1 | 4/2012 | |

OTHER PUBLICATIONS

Japanese Office Action received in corresponding Japanese Application No. 2014-550959 dated Oct. 6, 2015.
Extended European Search Report received in corresponding European Application No. 15167393.6 dated Sep. 10, 2015.

* cited by examiner

Fig. 6

| LU# | RG# | Stripe size | LU start address | LU size | IO characteristic |
|---|---|---|---|---|---|
| 0 | 0 | 64KB | 0x000000000 | 100GB | Sequential |
| 1 | 0 | 128KB | 0x100000000 | 200GB | Random |
| 2 | 5 | 64KB | 0x000000000 | 50GB | Sequential |
| .. | .. | .. | .. | .. | |
| 5 | 2 | 512KB | 0x200000000 | 2TB | Random |
| .. | .. | .. | .. | .. | |

| FMPK# | Corresponding RG# | Parity operation function support |
|---|---|---|
| 0 | 0 | Yes |
| 1 | 0 | Yes |
| 2 | 0 | Yes |
| : | : | : |
| 5 | Unallocated | — |
| | | : |

Fig. 11

| Logical page number (1101) | Physical page number (1102) | Old physical page number (1103) | 1100 |
|---|---|---|---|
| 0 | 100 | 90 |
| 1 | 500 | Unallocated |
| 2 | Unallocated | Unallocated |
| ⋮ | ⋮ | ⋮ |
| 100 | 300 | 80 |
| ⋮ | ⋮ | ⋮ |
| 1000 | Unallocated | 1000 |
| ⋮ | ⋮ | ⋮ |

| # | System function (1302) | Device function (1303) | Parity operation implementation (1304) | Option (1305) |
|---|---|---|---|---|
| 1 | Yes | Yes | Can select system controller/device controller | Example<br>-System controller determines own load<br>-Random-only implemented by device controller<br>-Configured in LU units |
| 2 | Yes | No | Only system controller | |
| 3 | No | Yes | Only device controller | |
| 4 | No | No | Not possible | |

STORAGE SYSTEM AND STORAGE APPARATUS

TECHNICAL FIELD

The present invention relates to technology for operating a redundancy code stored in a storage apparatus.

BACKGROUND ART

A technology for configuring a RAID (Redundant Array of Independent Disks) and preventing the loss of data in accordance with a storage system controller controlling multiple storage devices is known. For example, in a storage system, which uses RAID 5, the storage system controller, which is equivalent to a higher-level apparatus with respect to the storage device, creates parity from multiple data blocks.

There is a storage system in which the respective storage devices, which are equivalent to lower-level apparatuses, configure a RAID in order to reduce the processing of the storage system controller pursuant to creating the parity mentioned hereinabove. Each storage device, for example, is a HDD (Hard Disk Drive), and the controller of each HDD (hereinafter, HDD controller) creates parity.

For example, in Patent Literature 1, when there is a data update request with respect to pre-update data (old data), the HDD controller updates the old data to new data after creating an intermediate value (intermediate parity) for creating parity from the updated data (new data) and the pre-update data (old data). The HDD controller transfers the created intermediate parity to the HDD in which an old parity corresponding to the old data is being stored. In the HDD, which receives the intermediate parity, the HDD controller creates new parity from the intermediate parity and the old parity, and updates the old data with the created new parity.

In line with the lowering of flash memory prices in recent years, Flash SSD (Flash Solid State Drive) has been increasingly used in place of HDD as a storage device. In the HDD, when there is an update request with respect to data identified by a certain range of logical addresses, updated data (new data) is overwritten to the physical area in which the relevant data (old data) is stored. However, in the Flash SSD, since the overwriting of data is not possible, when there is an update request for data identified by a logical address, the updated data is stored in a physical area, which differs from the physical area in which the relevant data is stored, and the new physical area is mapped to the identified logical address. In accordance with this, the physical area in which the old data is stored in the Flash SSD is made invalid.

CITATION LIST

Patent Literature

PTL 1: U.S. Pat. No. 5,191,584

SUMMARY OF INVENTION

Technical Problem

In Patent Literature 1, since the old data is overwritten with the new data after the intermediate parity has been created, the old data ceases to exist subsequent to the creation of the intermediate parity. For this reason, in a case where a failure occurs prior to parity being updated (for example, prior to transferring the intermediate parity to the HDD in which the old parity is being stored) and the intermediate parity is lost, the old data no longer exists, and as such, intermediate parity cannot be created again.

Alternatively, in a case where the storage device has been replaced with Flash SSD, since data is not overwritten in the flash memory, there is the likelihood that the old data will remain subsequent to the intermediate parity having been created. However, in the Flash SSD, the physical area storing the old data is invalidated when new data is written, and the old data is deleted at a prescribed time. That is, in the Flash SSD, there is the likelihood that the old data will no longer exist when a failure occurs, in which case, intermediate parity will not be able to be created the same as in the Cited Document 1.

Solution to Problem

A storage system, which is one aspect of the present invention, comprises a first controller and a plurality of storage devices. The Plurality of storage devices configure RAID, each of which includes one or more non-volatile memory chips providing storage space where data from a host computer is stored, and a second controller coupled to the non-volatile memory chips. In case where the first controller receives an update request to update first data to second data, the second controller in a first storage device of the storage devices is configured to store the second data in an area different from an area where the first data has been stored, in the storage space of the first storage device; generate information that relates the first data and the second data; and generate an intermediate parity based on the first and the second data. The second controller in a second storage device of the storage devices that stores a first parity corresponding to the first data is configured to receive the intermediate parity, generate a second parity based on the first parity and the intermediate parity, and store the second parity in an area in the storage space of the second storage device. The second controller in the first storage device is configured to delete the information after the second parity is stored in the area in the storage space of the second storage device, and set the area where the first data has been stored as a erase target area.

BRIEF DESCRIPTION OF DRAWINGS

FIG. 6 shows an example of a LU management table 700.

FIG. 11 shows an example of a page mapping management table 1100.

FIG. 13 shows an example of a method 1300 for deciding a parity operation implementation apparatus.

DESCRIPTION OF EMBODIMENTS

A number of examples will be explained. The technical scope of the present invention is not limited to the examples.

In the following explanation, various types of information may be explained using the expression "* table", but the various information may also be expressed using a data structure other than a table. To show that the various information is not dependent on the data structure, "* table" can be called "*** information".

In the following explanation, there may be cases where the processing is explained having a "program" as the doer of the action. The stipulated processing is performed in accordance with a program being executed by a processor (for example, a CPU (Central Processing Unit)) while using a storage resource (for example, a memory) and a communication control device (for example, a communication port) as needed, and as such, the processor may also be the doer of the processing. A process, which is explained having a program as the doer of the action may be a process performed by a management system. Either all or part of the program may be realized using dedicated hardware. For this reason, a process, which is explained having a program as the doer of the action may be a process performed by a controller. The controller may comprise a processor, and a storage resource for storing a computer program to be executed by the processor, or may comprise the above-mentioned dedicated hardware. The computer program may be installed in respective computers from a program source. The program source, for example, may be either a program delivery server or a storage medium.

In the following explanation, a management system is either one or more computers, for example, management computers, or a combination of a management computer and a display computer. Specifically, for example, in a case where the management computer displays display information, the management computer is the management system. The same function as the management computer may be realized using multiple computers to increase processing speed and reliability, and in accordance with this, the relevant multiple computers (may comprise a display computer when a display is carried out on a display computer) are the management system.

Example 1

First, the configuration of a storage system, which is an example of the application of the present invention, will be explained.

Figure 1:
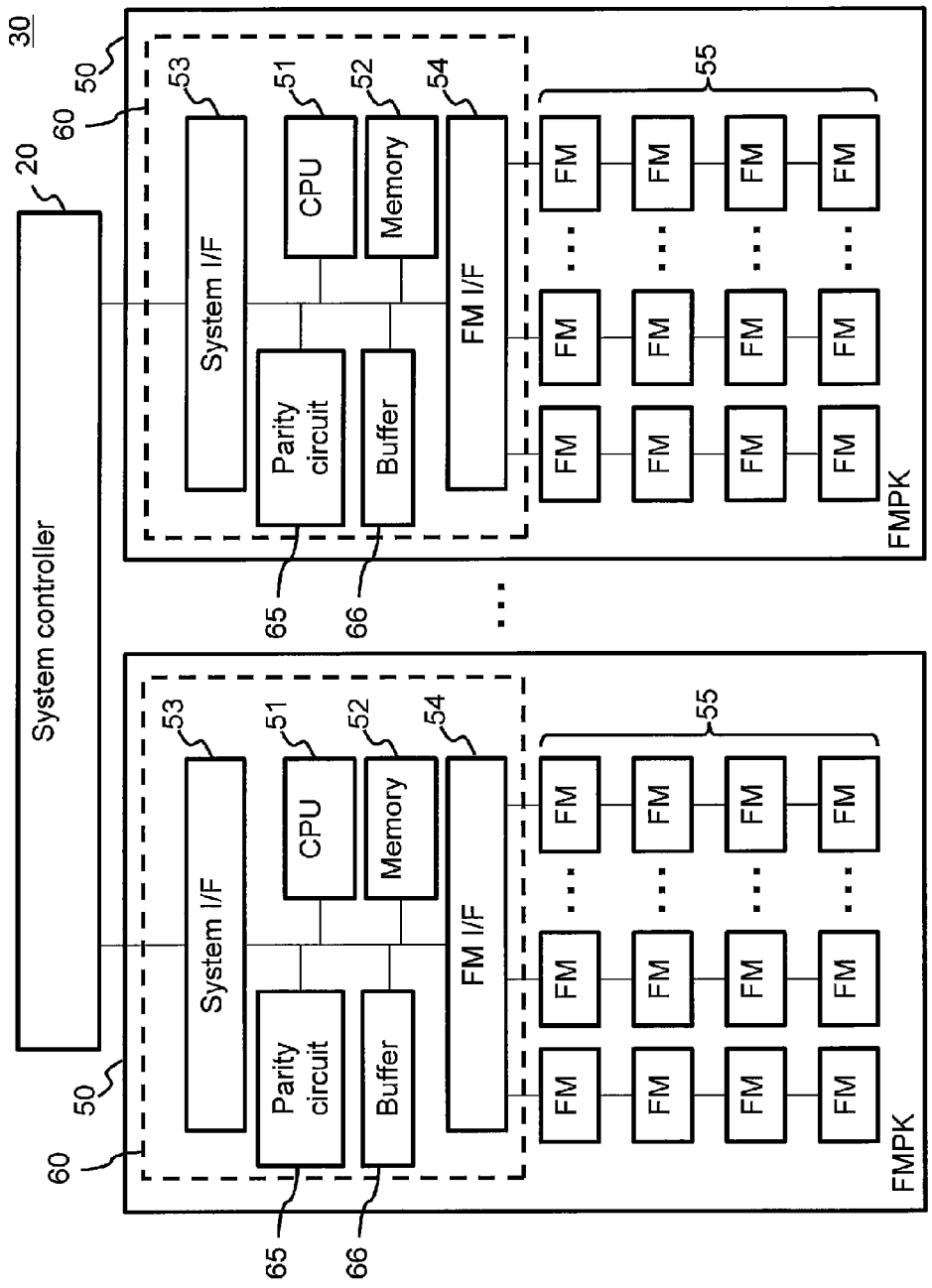
FIG. 1 shows an example of the configuration of a storage system.

FIG. 1 shows an example of the configuration of a storage system 30. This storage system 30 comprises multiple storage apparatuses 50 for storing data, and a system controller 20, which is coupled to these multiple storage apparatuses. The storage apparatus, for example, is a FMPK (Flash Memory Package) 50.

The FMPK 50 comprises a nonvolatile memory for storing data, and a device controller 60, which is coupled to the nonvolatile memory and the system controller 20. The nonvolatile memory, for example, is a NAND-type FM (Flash Memory) 55. The nonvolatile memory is not limited to a flash memory, and may be a recordable memory (for example, a phase-change memory). The device controller 60 comprises a communication interface device, a storage device, and a control device coupled thereto. The communication interface devices, for example, are a system interface 53 and a FM interface 54. In the following explanation, interface may be denoted as I/F. The system I/F 53 is coupled to the system controller 20. The FM I/F 54 is coupled to the FM 55.

The storage device, for example, is a memory 52 and a buffer 66. The control device, for example, is a CPU 51. The control device, in addition to a processor such as the CPU 51, may comprise a dedicated hardware circuit for performing prescribed processing (for example, compression, decompression, coding or decoding). The dedicated hardware circuit, for example, is a parity circuit 65 for computing either parity or a intermediate parity. The memory 52 stores a program and various types of information for controlling the FM 55. The CPU 51 realizes various types of functions in accordance with executing the program stored in the memory 52. The buffer 66, for example, is a volatile memory, such as a DRAM (Dynamic Random Access Memory). The buffer 66 temporarily stores data to be written to the FM 55, data read from the FM 55, and data during a parity operation.

The FMPK 50 may comprise multiple FMs 55. The multiple FMs 55 may comprise different types of storage media or may be the same type of storage media. For example, the FM 55 may comprise multiple physical blocks. The physical blocks may comprise multiple physical pages. Each cell inside the FM 55 may be a SLC (Single Level Cell) or a MLC (Multiple Level Cell). The nonvolatile memory may be another nonvolatile memory or may be a recordable memory, such as a phase-change memory.

Figure 2:
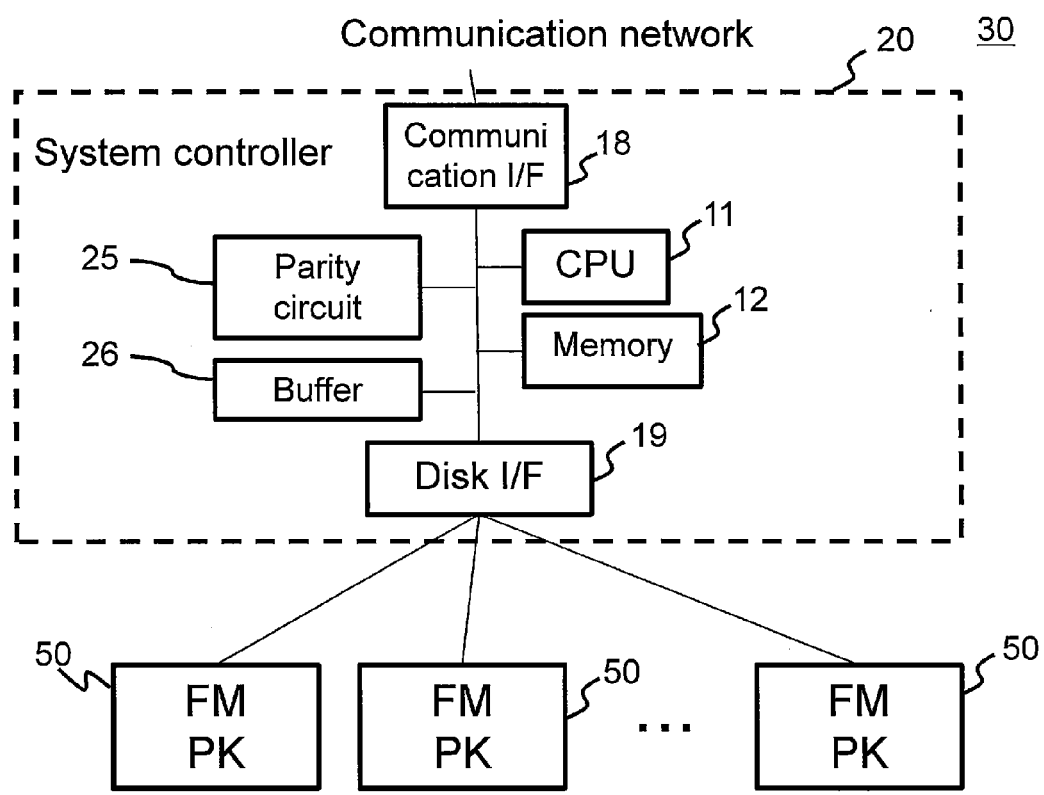
FIG. 2 shows an example of the configuration of a system controller 20.

FIG. 2 shows the configuration of the system controller 20. The system controller 20 comprises a communication interface device, a storage device, and a control device, which is coupled thereto. The communication interface devices, for example, are a communication I/F 18 for coupling to a communication network and a disk I/F 19 for coupling to the FMPK 50. The storage devices, for example, are a memory 12 and a buffer 26. The control device, for example, is a CPU 11. The control device, in addition to a processor such as the CPU 51, may comprise a dedicated hardware circuit for performing prescribed processing (for example, compression, decompression, coding or decoding). The dedicated hardware circuit, for example, is a parity circuit 25 for computing either parity or a intermediate parity. The memory 12 stores a program and various types of information for controlling the FMPK 50. The CPU 51 realizes various types of functions in accordance with executing the program based on the information stored in the memory 12. The buffer 26, for example, is a volatile memory, such as a DRAM. The buffer 26 temporarily stores data to be written to the FMPK 50, data read from the FMPK 50, and data during a parity operation. When each FMPK 50 connected to the system controller 20 has the parity circuit 65, the system controller 20 does not have to comprise a parity circuit 25.

The functions provided by a prior art system controller equivalent to the system controller 20 include a parity operation, a snapshot, data compression, and duplicate elimination, but these functions can be realized by the FMPK 50 or other such storage medium. In this example, a parity operation function will be explained.

Since the system controller 20 and the device controller 60 form a hierarchy, the system controller 20 can be defined as the higher-level controller, and the device controller 60 can be defined as the lower-level controller.

Next, a computer system, which is an example of the application of a storage system 30 in a case where the system controller 20 is a controller supporting RAID (Redundant Array of Independent Disks) functions, will be explained.

Figure 3:
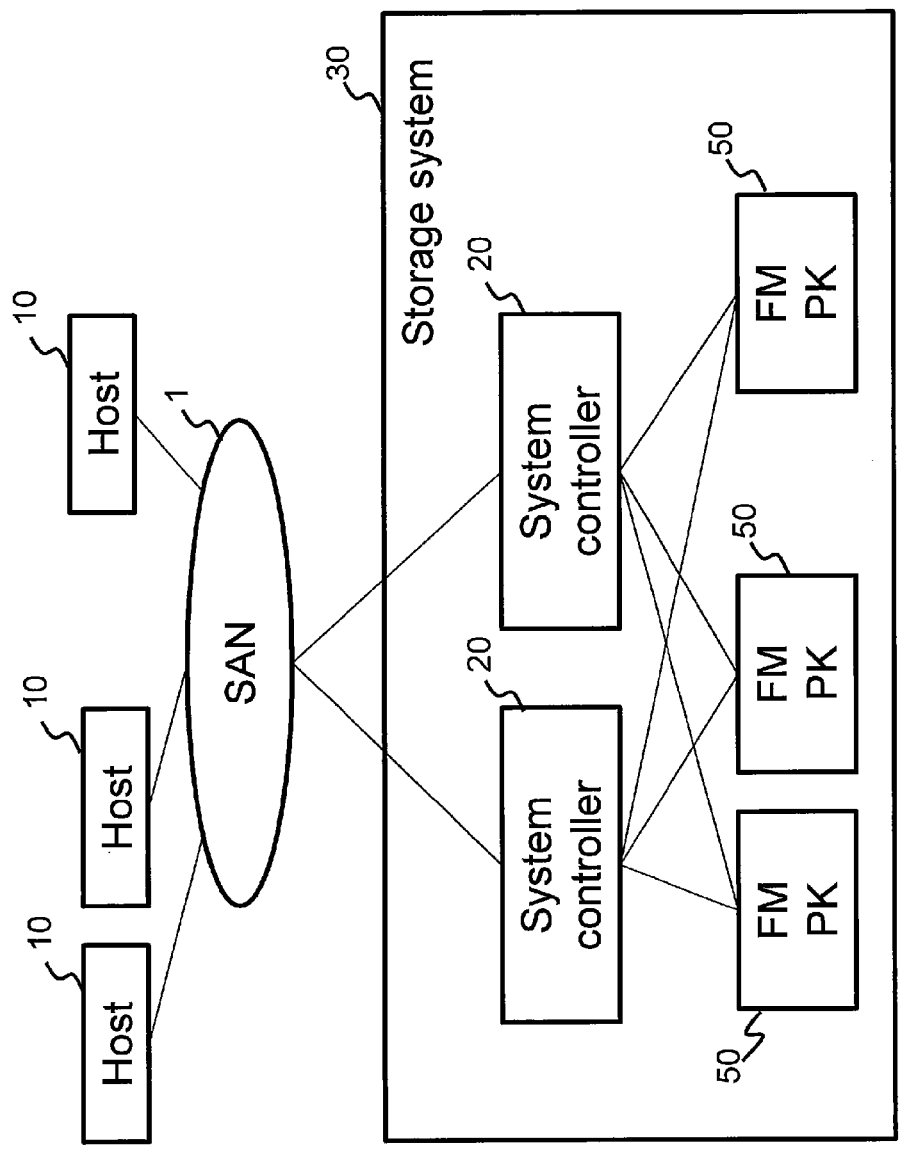
FIG. 3 shows an example of the configuration of a computer system related to Example 1.

FIG. 3 shows an example of the configuration of a computer system related to Example 1. This computer system comprises a host computer 10 and a storage system 30. The host computer 10 and the storage system 30 are coupled via a communication network, for example, a SAN (Storage Area Network 1. The computer system may comprise multiple host computers 10. In this case, the storage system 30 is coupled to the multiple host computers 10 via the SAN 1.

The storage system 30 comprises multiple FMPKs 50, and a system controller 20 for controlling these FMPKs 50. The storage apparatus, for example, is the FMPK 50. In this example, the system controller 20, for example, is a RAID controller. In addition, in this example, the storage system 30 comprises multiple system controllers 20. Each system controller 20 is coupled to the host computer 10 via the SAN 1. Each of the multiple FMPKs 50 is coupled to the multiple system controllers 20. The storage system 30 may comprise only one system controller 20.

The configuration of the system controller 20 is the same as the configuration shown in FIG. 2. The memory 12 also stores a program and various types of information for a RAID function, which uses the multiple FMPKs 50. In this example, the system controller 20 comprises a parity circuit 25, but need not comprise a parity circuit 25.

The host computer 10 may be a management system.

A case where the system controller 20 performs RAID 5 control will be explained hereinbelow.

Figure 4:
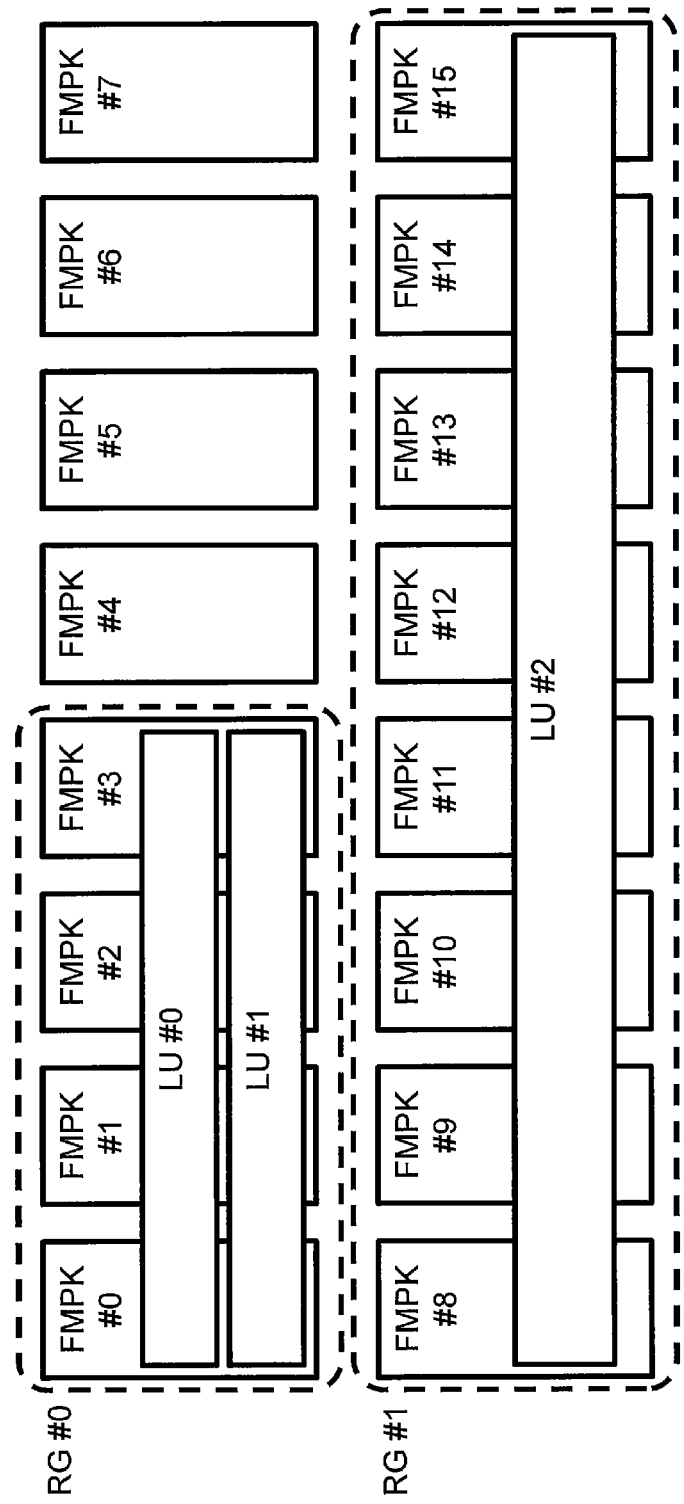
FIG. 4 shows an example of the configurations of a RG and a LU.

The system controller 20 is associated with a RG (RAID Group), a LU (Logical Unit, may also be called a logical volume), and a FMPK 50. FIG. 4 shows an example of the configurations of the RG and LU. The system controller 20 allocates a number of FMPKs 50 to the RG, and allocates either all or part of the RG storage area to the LU. Furthermore, the logical volume may be a virtual volume in which the capacity of the volume has been virtualized in accordance with thin provisioning technology. A physical storage area for storing data is not allocated to the virtual volume beforehand. A physical storage area is allocated to a relevant virtual volume in prescribed units in accordance with a write request to the relevant virtual volume.

Figure 5:
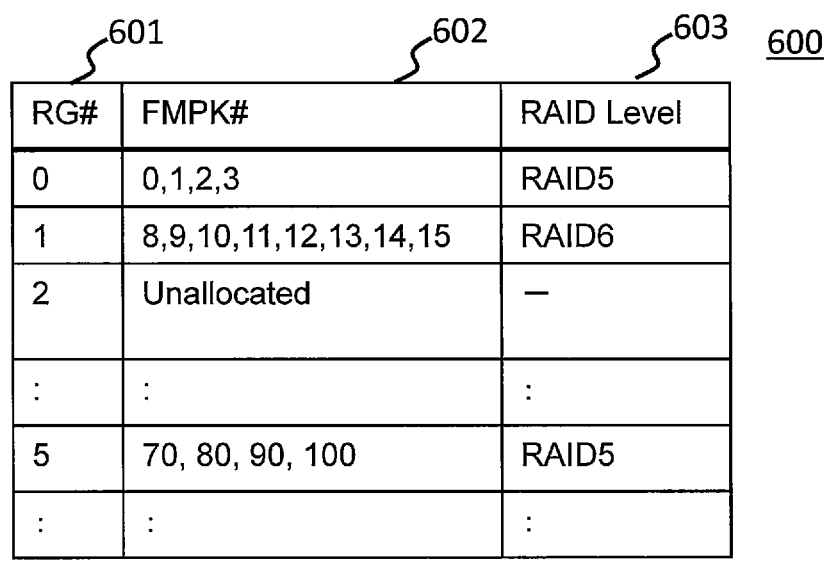
FIG. 5 shows an example of a RG management table 600.
Figure 7:
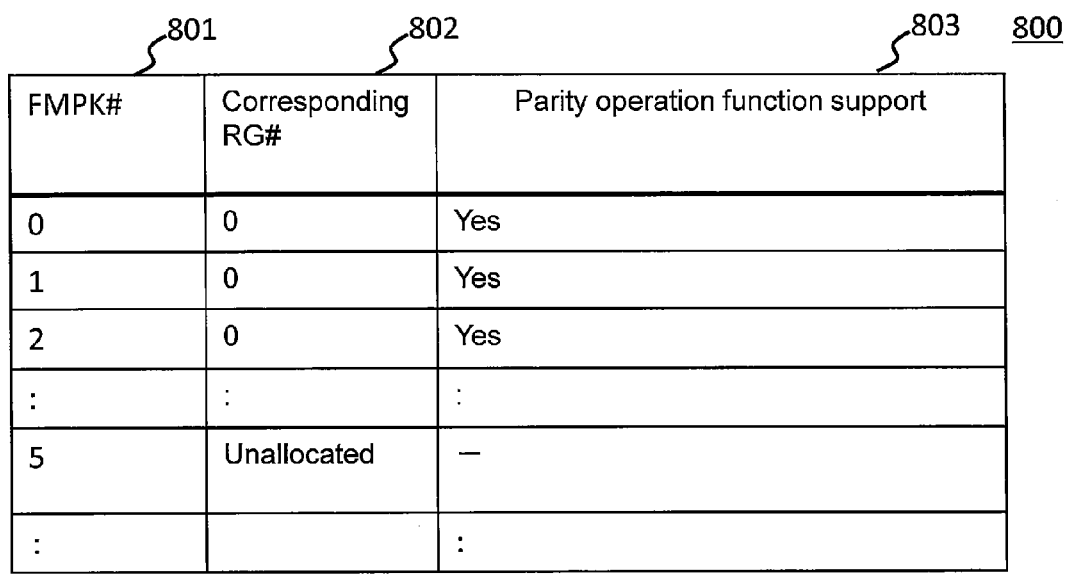
FIG. 7 shows an example of a FMPK management table 800.

FIG. 5 shows an example of a RG management table 600. FIG. 6 shows an example of a LU management table 700. FIG. 7 shows an example of a FMPK management table 800. The system controller 20 writes the relationships of the RG (RAID Group), the LU (Logical Unit), and the FMPK 50 to the RG management table 600, the LU management table 700, and the FMPK management table 800 in the memory 12.

The RG management table 600 comprises a record for each RG. One RG record shows a RG number 601, which denotes the RG, a FMPK number 602, which denotes the FMPK 50 allocated to the RG, and a RAID level 603 of the RG.

The LU management table 700 comprises a record for each LU. One LU record shows a LU number 701, which denotes the LU, an RG number 702, which denotes the RG allocated to the LU, a stripe size 703, which is the size of the stripe block allocated to the LU, a LU start address 704, which is the logical start address of this LU, a LU size 705, which is the size of the LU, and an IO characteristic 706 of the LU. The IO characteristic 706 is a trend of an IO pattern carried out with respect to the LU, and denotes which is stronger, a sequential trend or a random trend.

The IO characteristic 706 may be specified beforehand by a user, or may be determined by the system controller 20. Or a combination thereof, in which the initial value of the IO characteristic 706 may be specified beforehand by the user, and, after the passage of a prescribed time, the system controller 20 may optimize the initial value in accordance with a determination. As a method for determining the IO characteristic 706, for example, the system controller 20 may collect a command statistic for a certain LU at each unit of time, and may determine the higher of a random IO pattern and a sequential IO pattern as the IO characteristic 706 of the relevant LU. The types of commands include a random write and a sequential write. The comparison of the percentage of random writes with the percentage of sequential writes may be done by comparing the frequency of these commands. The amount of data written in accordance with these commands may also be compared. In addition, the system controller 20 may monitor the IO characteristic 706 on a fixed cycle in accordance with the above-mentioned determination method, and may update the LU management table 700 in a case where a change is necessary.

The FMPK management table 800 comprises a record for each FMPK 50. One FMPK 50 record comprises a FMPK number 801, which denotes the FMPK 50, corresponding RG number 802, which denotes the RG to which the FMPK 50 belongs, and parity operation function support information 803, which denotes the parity operation function of this FMPK 50. The parity operation function support information 803, for example, is a flag denoting whether or not this FMPK 50 comprises a parity operation function, such as a parity circuit 65.

Figure 8:
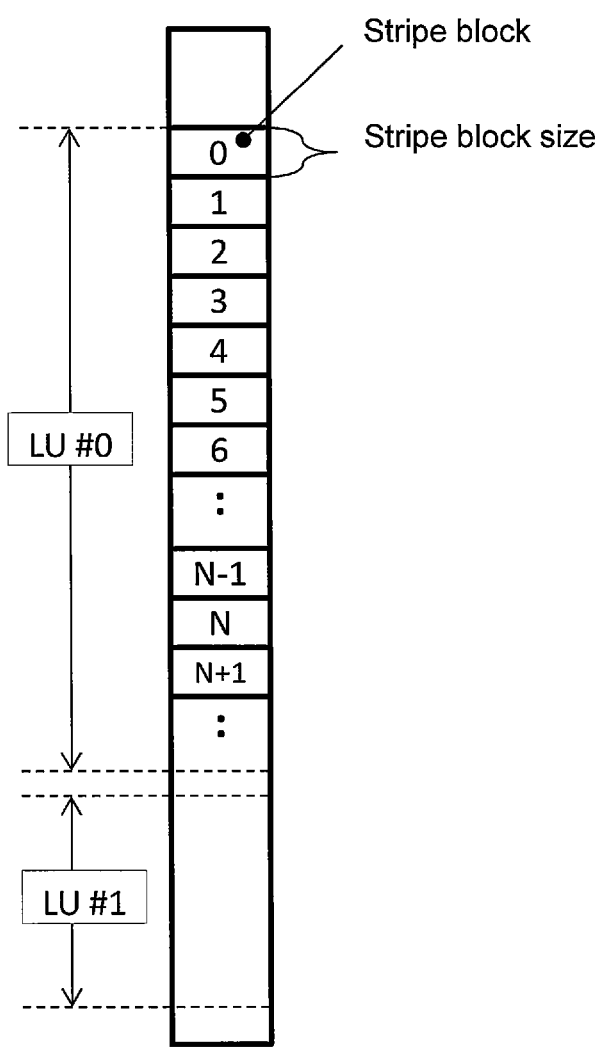
FIG. 8 shows an example of an address space on a RG.
Figure 9:
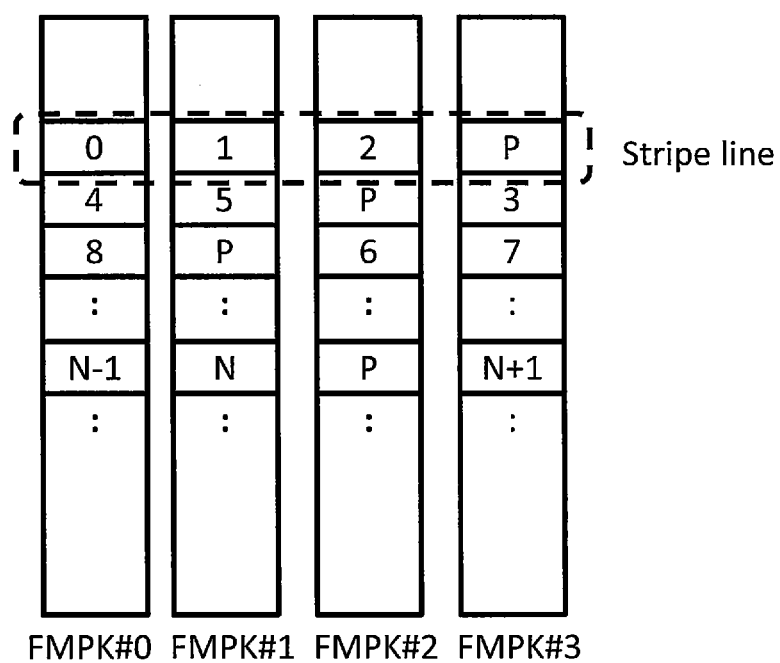
FIG. 9 shows an example of an address space on a FMPK 50 belonging to a RG.

FIG. 8 shows an example of an address space on a RG. FIG. 9 shows an example of an address space on a FMPK 50 belonging to the RG. In this example, the system controller 20 allocates FMPK #0 through FMPK #3, which are four FMPKs 50, to a RAID 5 RG #0. In addition, the system controller 20 allocates successive areas from the address space on the RG #0 to a LU #0, and allocates different successive area to a LU #1. The system controller 20 allocates a stripe line spanning the address spaces on the FMPK #0 through the FMPK #3, and allocates stripe blocks and parity in the order of the stripe lines and FMPK numbers. At this point, the system controller 20 shifts the FMPK number, which allocates a stripe block and parity, for each stripe line. At this time, the system controller 20 writes information related to the RG #0, the LU #0 and the LU #1 to the RG management table 600, the LU management table 700, and the FMPK management table 800.

Figure 10:
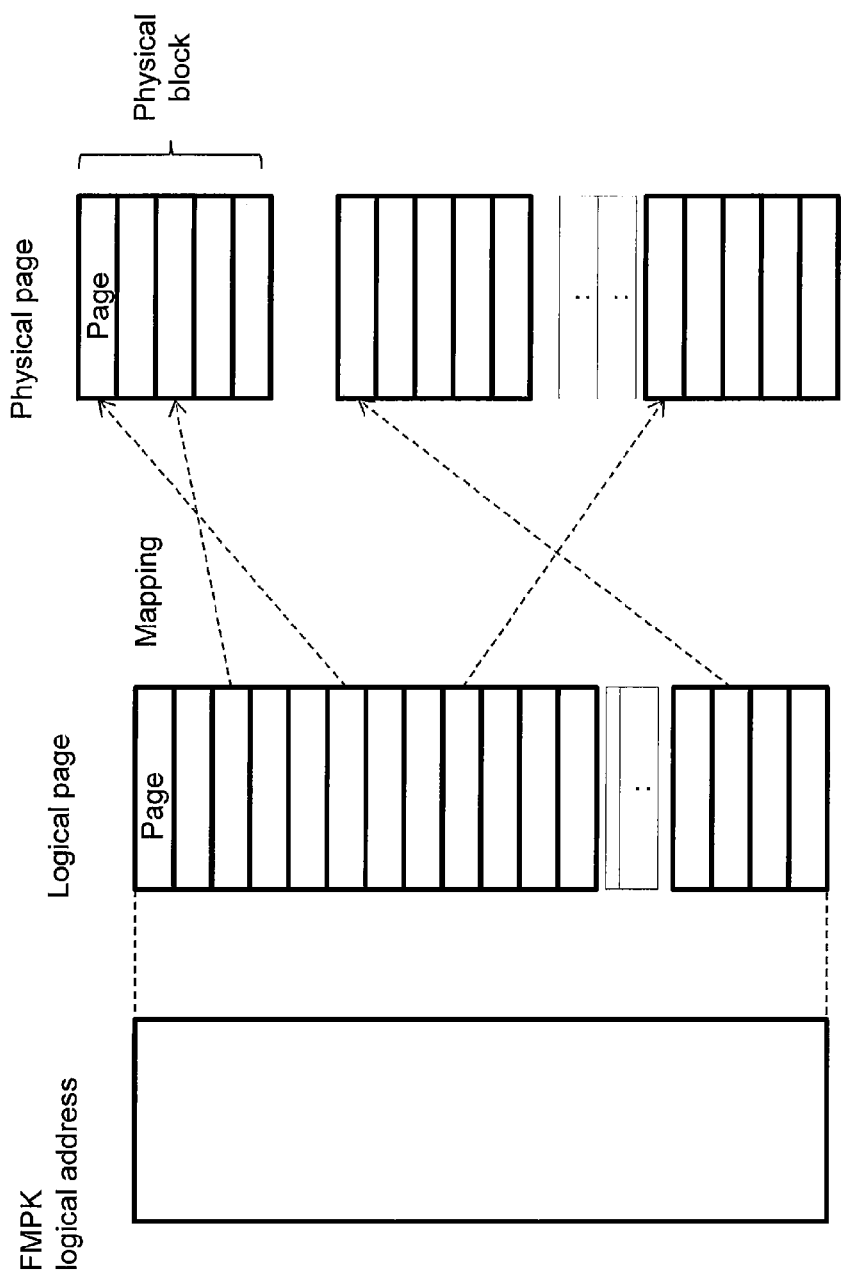
FIG. 10 shows an example of page mapping in a FMPK 50.

FIG. 10 shows an example of page mapping in a FMPK 50. A logical address space on a FMPK 50 is partitioned into multiple logical pages. Alternatively, a physical address space on the FMPK 50 is partitioned into multiple physical blocks, and, in addition, each physical block comprises a prescribed block size, and is allocated to multiple physical pages. Each logical page and each physical page comprises a prescribed page size.

A physical block or some other physical area may be used instead of the physical page. In addition, a logical unit or some other logical area may be used instead of the logical page.

FIG. 11 shows an example of a page mapping management table 1100. The device controller 60 associates a logical page with a physical page, and writes this relationship to the page mapping management table 1100 in the memory 52. The page mapping management table 1100 comprises a record for each logical page. One logical page record denotes a logical page number 1101, which denotes the logical page, a physical page number 1102, which denotes a current physical page, which is the physical page currently allocated to the logical page, and an old physical page number 1103, which denotes an old physical page, which is the physical page that was allocated to the logical page previous to the current physical page. That is, the old physical page associated with a certain logical page denotes the current physical page, which had been associated with the logical page in the previous generation. The old physical page, which is associated with the logical page, is regarded as a valid page, and this association is maintained until the association with the logical page is cancelled. Since an old physical page, for which the association has been cancelled, transitions to an invalid page, the data inside the old physical page is erased at a prescribed timing in accordance with a reclamation process or the like. In a flash memory in which the memory characteristics are such that data cannot be overwritten, the reclamation process refers to a process, which erases invalid data (data stored in an invalid page) and sets the page in which this invalid data was stored to a writable state once again. Since data is erased in block units in the flash memory, in a case where there are both a valid page(s) and an invalid page(s) inside a target block, the FM controller 1447 erases the invalid data stored in the target block after moving the data inside the valid page(s) to another block. In this example, the FM controller 1447 determines that the physical page 1102, which is associated with the logical page, and the old physical page 1103 are valid pages, and executes reclamation processing.

A specific example of a management method for an old physical page will be explained. The device controller 60 determines whether or not an old physical page shown in the page mapping management table 1100 is no longer necessary, and in a case where the determination is that a certain old physical page is no longer needed, may cancel the association between this old physical page and the logical page. For example, an upper limit for the number of old physical pages managed by the device controller 60 is configured beforehand, and the device controller 60 deletes the old physical pages from the page mapping management table 1100 in order from the oldest. The device controller 60 may also delete an old physical page from the page mapping management table 1100 in accordance with an instruction from the system controller 20. An example of determination criteria is determination as to whether parity update resulting from data update has been accomplished or not.

In addition, the system controller 20 may determine whether or not the data of the old physical page is needed, and in a case where the determination is that the old physical page is not needed, may instruct the device controller 60 corresponding to the old physical page to delete the old physical page from the page mapping management table 1100. Either the system controller 20 or the device controller 60 may delete an old physical page from the page mapping management table 1100 in a case where the used capacity of the FM 55 has become equal to or larger than a fixed value. In a case where a request to read data from an old physical page has been issued, and, in addition, the old physical page remains in the page mapping management table 1100, the device controller 60 can read the data from the old physical page.

Next, the operation of the system controller 20 will be explained.

First, a write method at data update time will be explained.

The write methods, for example, are a read-modify-write and a full-stripe write. The read-modify-write of this example is a process for updating the data of one stripe block specified within a single stripe line. Alternatively, the full-stripe write of this example is a process for updating all the data in a single stripe line. The read-modify-write computes a intermediate parity from old data in a specified stripe block and new data, and computes a new parity from the intermediate parity and an old parity. The full-stripe write computes a new parity based on all new data. As used here, old data refers to pre-update data, new data refers to post-update data, old parity refers to a pre-update parity, and new parity refers to a post-update parity. A intermediate parity is parity part way through a parity operation, and denotes the difference between an old parity and a new parity.

Next, a parity operation function will be explained.

The parity operation function, for example, is the parity circuit 25 and the parity circuit 65, and computes an exclusive OR between the data of two stripe blocks in a single stripe line. The parity operation function also computes an exclusive OR between old data and new data as a intermediate parity. In addition, the parity operation function computes an exclusive OR between an old parity and a intermediate parity as a new parity. Supposing that old data is Di, new data is Di_new, and an old parity is P, a new parity P_new is expressed using the following equation.

$$P\_new = P + (Di + Di\_new)$$

The operator "+" here represents the exclusive OR, and (Di+DI_new) represents the intermediate parity. The intermediate parity is equivalent to an exclusive OR between all data other than the Di.

Another redundancy code, such as a Hamming code, may be used instead of parity.

Next, a parity operation function registration process for the system controller 20 to register parity operation function support information 803 in the FMPK management table 800 will be explained.

Figure 12:
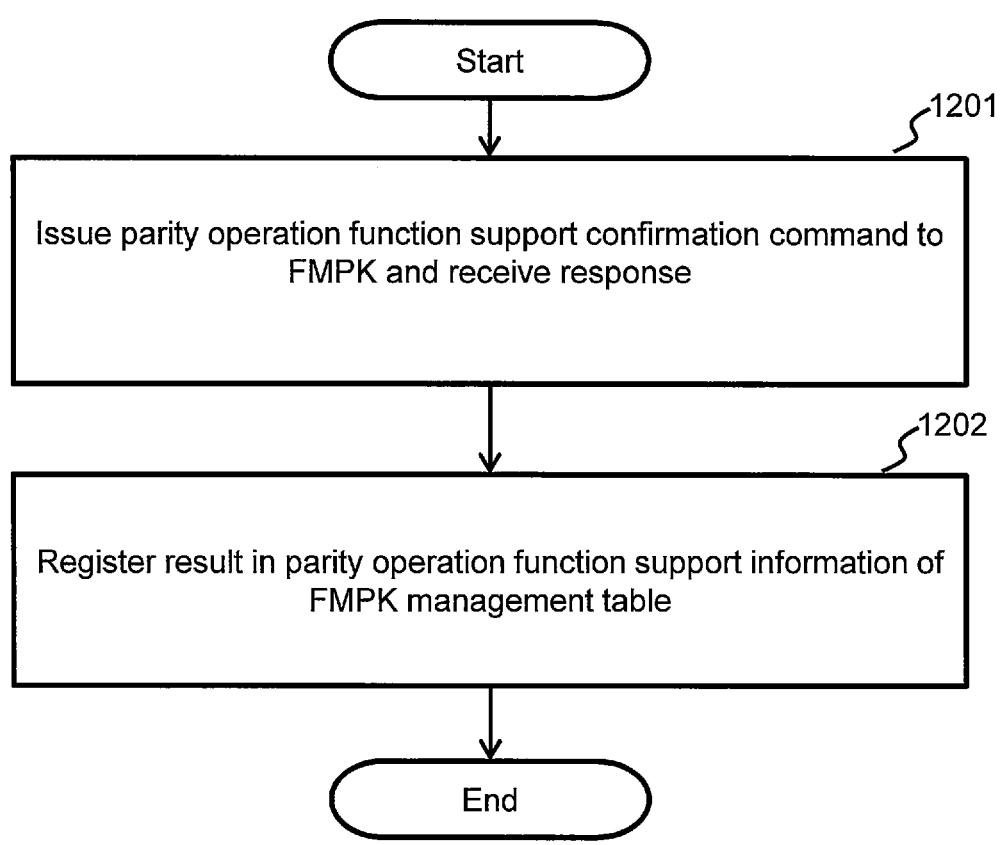
FIG. 12 shows an example of a parity operation function registration process.

FIG. 12 shows an example of a parity operation function registration process. The system controller 20 performs a parity operation function registration process when a new FMPK 50 is installed, and at system controller 20 ramp up.

First, the system controller 20 issues a parity operation function support confirmation command to the FMPK 50 device controller 60, and receives a response thereto (1201). The device controller 60, which receives the parity operation function support confirmation command at this time, sends a response to the system controller 20 denoting whether or not the device controller 60 itself comprises a parity operation function. Next, the system controller 20, based on the response, registers the information demoting whether or not the device controller 60 comprises a parity operation function in the parity operation function support information 803 of the FMPK management table 800 (1202), and ends this flow of processing.

The user may register the parity operation function support information 803 beforehand instead of carrying out a parity operation function registration process.

Next, a method for deciding a parity operation implementation apparatus for performing a parity operation will be explained.

FIG. 13 shows an example of a parity operation implementation apparatus decision method 1300. The system controller 20 determines either the system controller 20 or the device controller 60 as the parity operation implementation apparatus in accordance with the decision method 1300. The system controller 20 determines either the system controller 20 or the device controller 60 as the parity operation implementation apparatus based on information, which denotes whether or not the system controller 20 comprises a parity operation function, such as the parity circuit 25, and the parity operation function support information 803 of the FMPK management table 800. Four cases for deciding the parity operation implementation apparatus are defined. Each case shows a case number 1301, system function information 1302, which denotes whether or not the system controller 20 comprises a parity operation function, device function information 1303, which denotes whether or not the device controller 60 comprises a parity operation function, parity operation implementation information 1304, which denotes the parity operation implementation apparatus, and an option 1305.

Case #1 is a case where the system controller 20 comprises a parity operation function, and, in addition, the device controller 60 also comprises a parity operation function. According to the parity operation implementation information 1304, in this case, the system controller 20 can select either the system controller 20 or the device controller 60 as the parity operation implementation apparatus. In this case, the system controller 20 performs a write process, which will be explained further below, based on the option 1305.

Case #2 is a case where the system controller 20 comprises a parity operation function, but the device controller 60 does not comprise a parity operation function. According to the parity operation implementation information 1304, in this case, the system controller 20 selects the system controller 20 as the parity operation implementation apparatus.

Case #3 is a case where the system controller 20 does not comprise a parity operation function, but the device controller 60 does comprise a parity operation function. According to the parity operation implementation information 1304, in this case, the system controller 20 selects the device controller 60 as the parity operation implementation apparatus.

Case #4 is a case where the system controller 20 does not comprise a parity operation function, and, in addition, the device controller 60 does not comprise a parity operation function. According to the parity operation implementation information 1304, in this case, the system controller 20 is unable to select either the system controller 20 or the device controller 60 as the parity operation implementation apparatus.

The parity operation function registration process and the parity operation implementation apparatus decision may be omitted. For example, in a case where the system controller 20 and all the device controllers 60 comprise parity operation functions, the system controller 20 may omit the parity operation function registration process and the parity operation implementation apparatus decision, and perform the write process in case #1, which will be explained hereinbelow. These processes can also be omitted in a case where the parity operation implementation apparatus has been installed beforehand by an administrator or the like.

Next, the write process of the system controller 20 in cases #1 to #3 will be explained.

Figure 14:
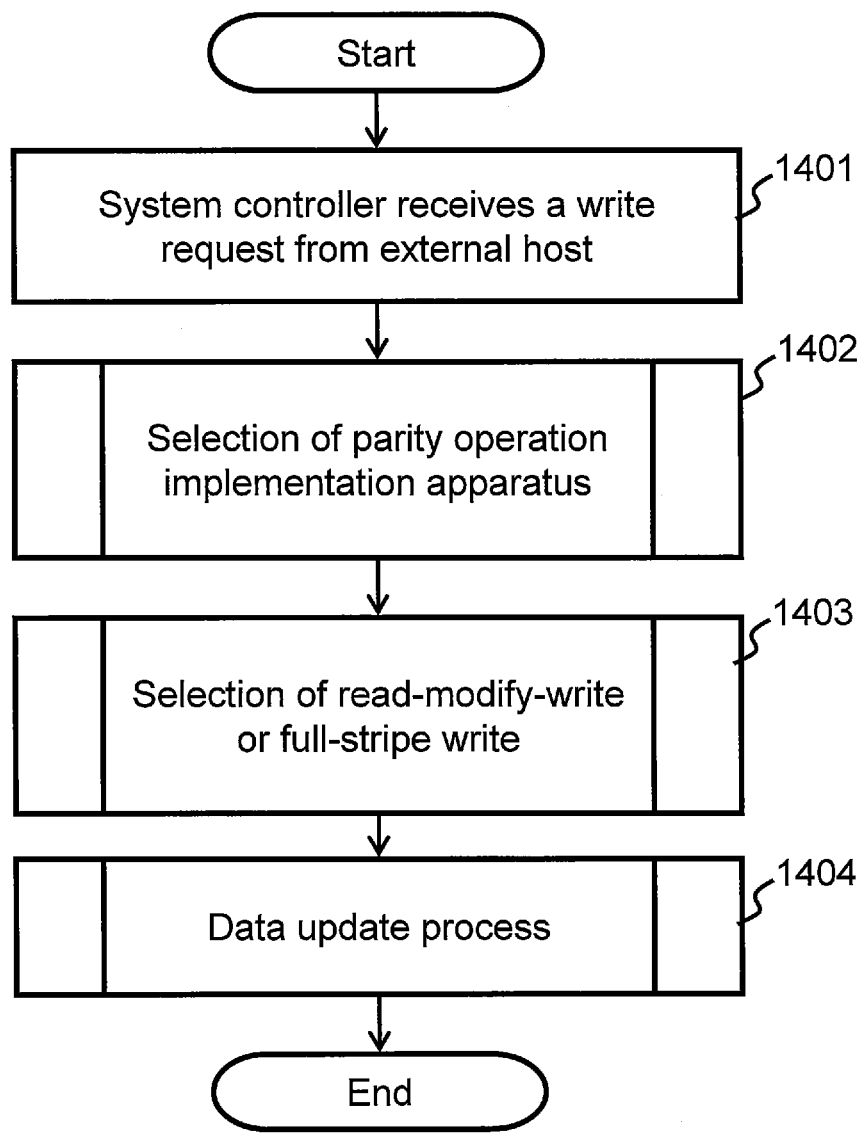
FIG. 14 shows an example of a system controller 20 write process.

FIG. 14 shows an example of a write process of the system controller 20. First, the system controller 20 receives a write request as an IO request from an external host (1401). The external host, for example, is a host computer 10 coupled to the system controller 20 via the SAN 1. Next, the system controller 20 performs a parity operation selection process for selecting one of the system controller 20 or the device controller 60 as the parity operation implementation apparatus for performing a parity operation (1402). In the cases #2 and #3, since the parity operation implementation apparatus is already selected, the process in Step 1402 is omitted. Next, the system controller 20 performs a write method selection process for selecting the write method based on the received command (1403). The write method is one of either the read-modify-write or the full-stripe write. Next, the system controller 20 performs a data update process for updating data and parity in the device controller 60 in accordance with the selected write method (1404).

Next, a number of specific examples of the parity operation selection process 1402 will be explained.

First, a first parity operation selection process, which is a specific example of a process in which the system controller 20 selects a parity operation implementation apparatus based on the IO characteristic 706 of each LU, will be explained.

Figure 15:
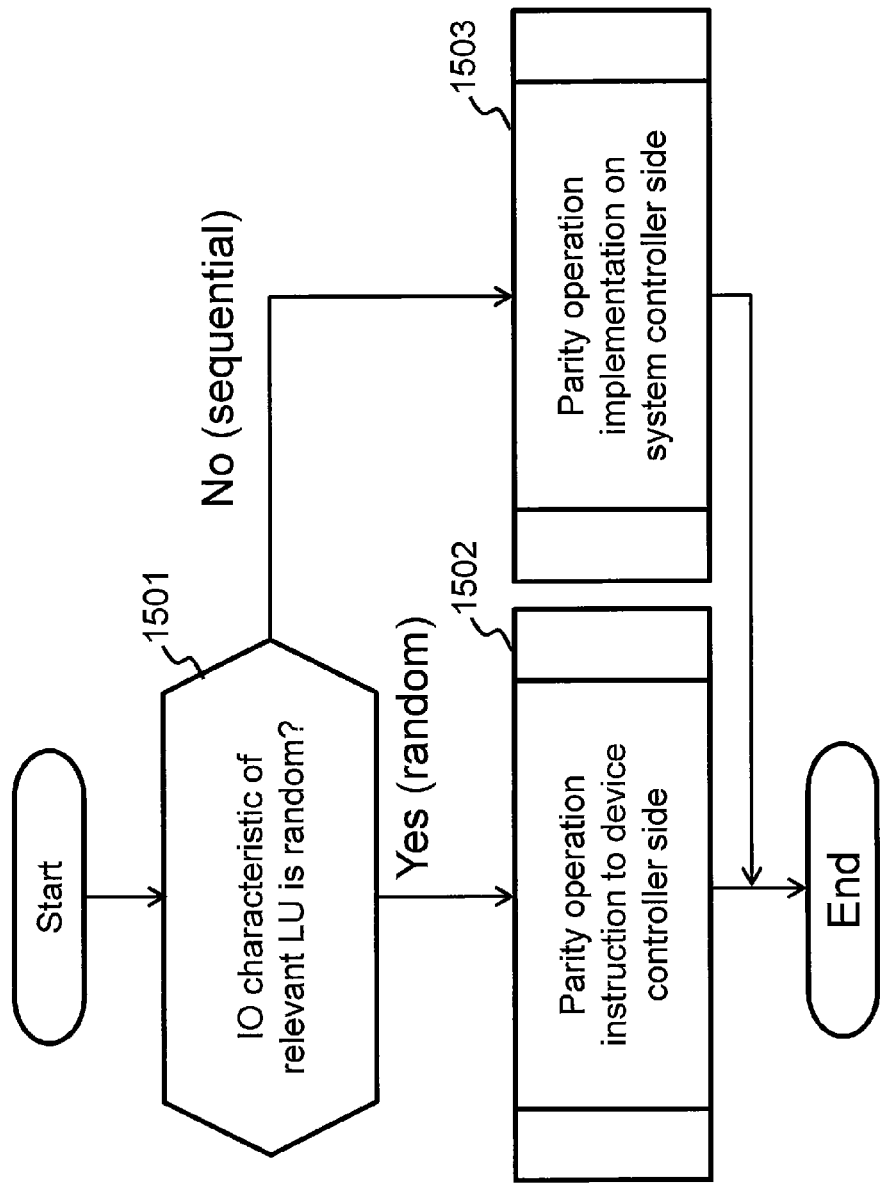
FIG. 15 shows an example of a first parity operation selection process.

FIG. 15 shows an example of a first parity operation selection process. First, the system controller 20 determines whether or not the IO characteristic 706 of the LU targeted for the relevant write is random based on the LU management table 700 (1501). In a case where the relevant LU IO characteristic 706 denotes random (1501: Yes), the system controller 20, in accordance with selecting the device controller 60 as the parity operation implementation apparatus, decides to instruct the device controller 60 to perform a parity operation (1502), and ends this flow of processing. Alternatively, in a case where the relevant LU IO characteristic 706 does not show random (1501: No), more specifically, in the case of sequential write to be described later, the system controller 20, in accordance with selecting the system controller 20 as the parity operation implementation apparatus, decides that the system controller 20 will implement the parity operation (1503), and ends this flow of processing.

That is, on the occasion of an TO, the system controller 20 references the IO characteristic 706 of the LU management table 700, and in a case where the IO characteristic 706 shows that the number of random writes is greater than the number of sequential writes with respect to writes to the relevant LU, instructs the device controller 60 to create parity. Alternatively, in a case where the IO characteristic 706 shows that random writes are fewer than sequential writes with respect to writes to the relevant LU, the system controller 20 implements parity creation.

Next, a second parity operation selection process, which is a specific example of a process in which the system controller 20 detects the hardware load of the system controller 20 and selects the parity operation implementation apparatus based on this load, will be explained.

Figure 16:
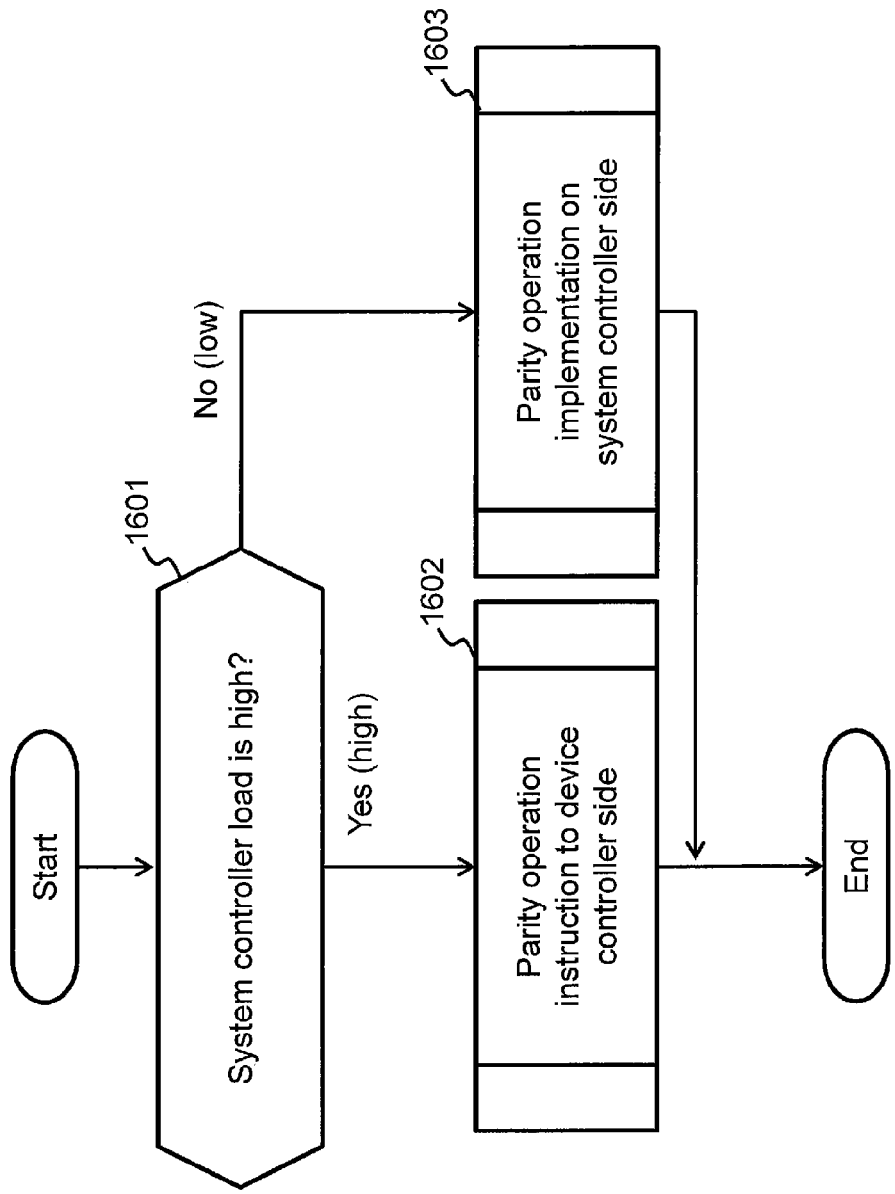
FIG. 16 shows an example of a second parity operation selection process.

FIG. 16 shows an example of a second parity operation selection process. The hardware, for example, is the CPU 11, the memory 12, and the parity circuit 25. First, the system controller 20 determines whether or not its own hardware load is higher than a reference (1601). In a case where the determination is that the hardware load is higher than a reference (1601: Yes), the system controller 20 selects the device controller 60 as the parity operation implementation apparatus, instructs the device controller 60 to perform a parity operation (1602) and ends the flow of processing. Alternatively, in a case where it is determined that the hardware load is not higher than a reference (1601: No), the system controller 20 selects the system controller 20 as the parity operation implementation apparatus (1603), and ends the flow of processing.

The system controller 20, for example, measures the load on the system controller 20 hardware here, and in a case where the measurement result exceeds a prescribed threshold, determines that the hardware load is high. The measurement results, for example, are the CPU 11 utilization rate, the amount of memory 12 used, and the amount of data inputted to the parity circuit 25.

Next, a third parity operation selection process, which is a specific example of a process in which the system controller 20 selects the parity operation implementation apparatus based on the IO pattern of the relevant write, will be explained.

Figure 17:
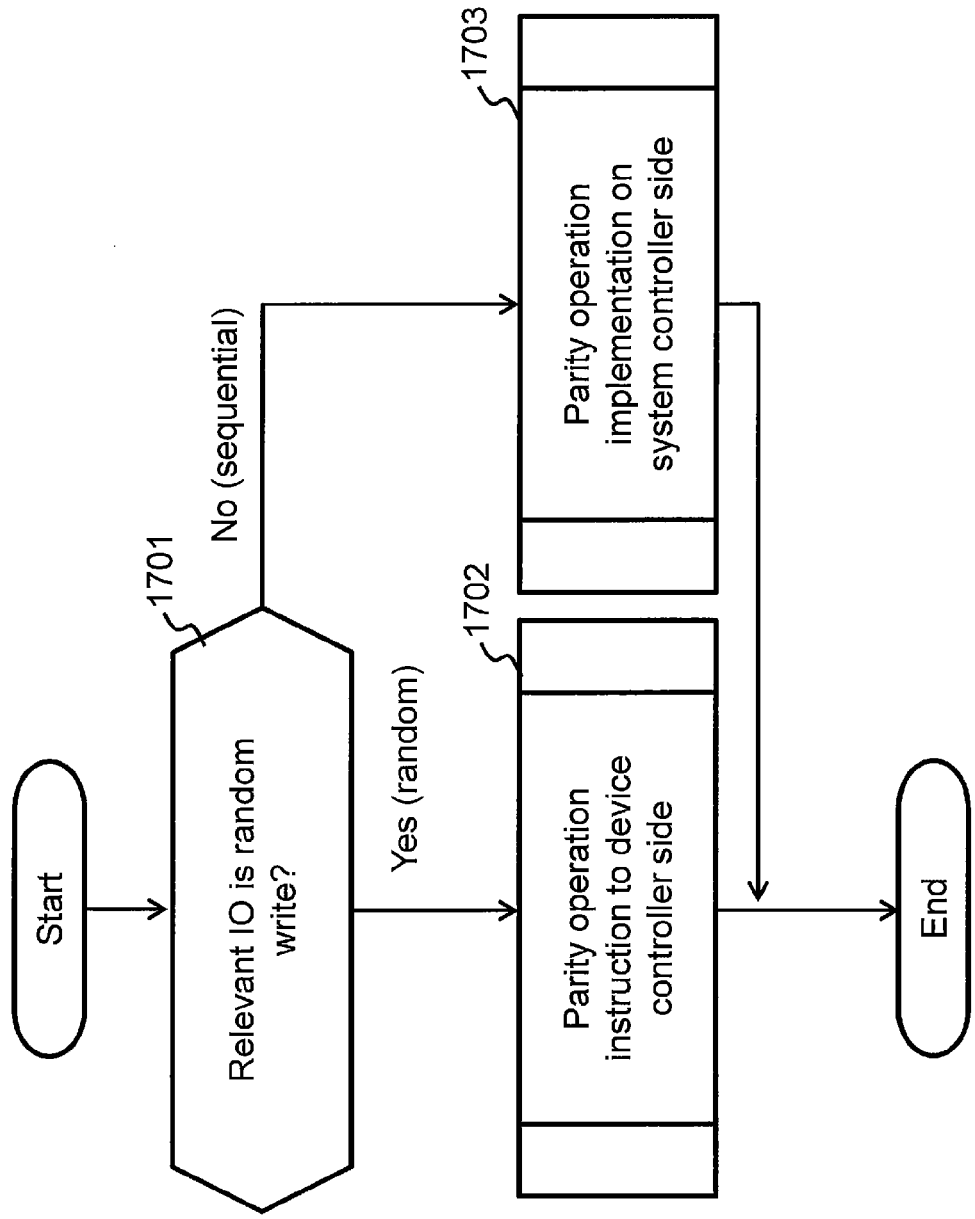
FIG. 17 shows an example of a third parity operation selection process.

FIG. 17 shows an example of a third parity operation selection process. First, the system controller 20 determines whether or not the IO pattern of the relevant IO request is a random write (1701). In a case where it is determined that the IO pattern is a random write (1701: Yes), the system controller 20 selects the device controller 60 as the parity operation implementation apparatus, instructs the device controller 60 to perform a parity operation (1702), and ends this flow of processing. Alternatively, in a case where it is determined that the IO pattern is not a random write, that is, in a case where it has been determined that the IO pattern is a sequential write (1701: No), the system controller 20 selects the system controller 20 as the parity operation implementation apparatus (1703), and ends the flow of processing.

Next, a fourth parity operation selection process, which is a specific example of a process in which the system controller 20 selects the parity operation implementation apparatus based on the IO pattern of the relevant write and the hardware load of the system controller 20, will be explained.

Figure 18:
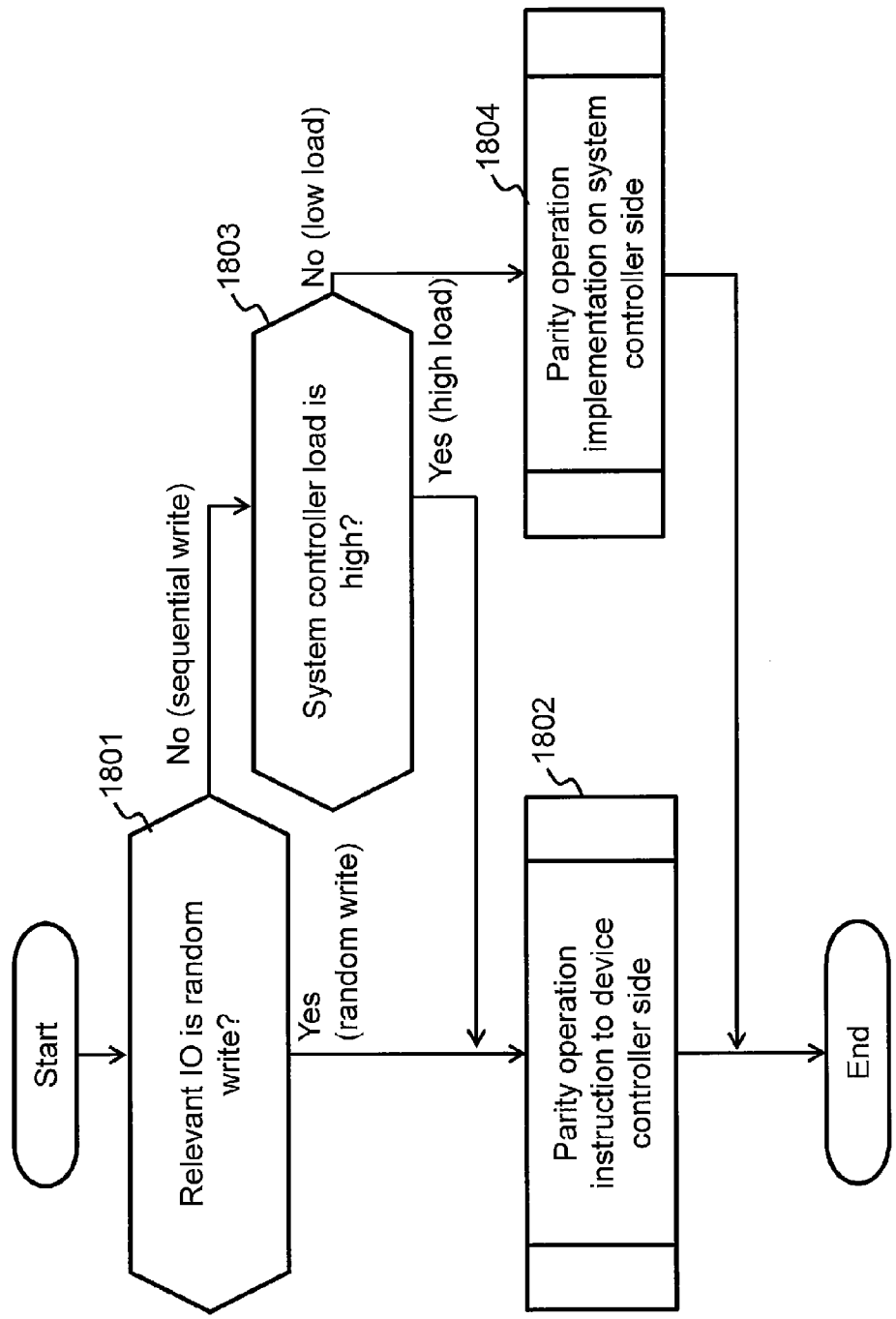
FIG. 18 shows an example of a fourth parity operation selection process.

FIG. 18 shows an example of a fourth parity operation selection process. First, the system controller 20 determines whether or not the IO pattern of the relevant write is a random write (1801). In a case where it is determined that the IO pattern is a random write (1801: Yes), the system controller 20 selects the device controller 60 as the parity operation implementation apparatus, instructs the device controller 60 to perform a parity operation (1802), and ends the flow of processing. Alternatively, in a case where it is determined that the IO pattern is not a random write (1801: No), the system controller 20 determines whether or not the hardware load is high (1803). In a case where it is determined that the hardware load is high (1803: Yes), the system controller 20 moves the flow of processing to 1802. Alternatively, in a case where it is determined that the hardware load in not high (1803: No), the system controller 20 selects the system controller 20 as the parity operation implementation apparatus (1804), and ends the flow of processing.

The system controller 20 may also select a parity operation implementation apparatus in accordance with combining the multiple types of parity operation selection processes 1402 described hereinabove.

In accordance with the system controller 20 performing a parity operation at the time of a sequential write and a full-stripe write, it is possible to prevent an increase in the amount of data transferred from the system controller 20 to the device controller 60. This makes it possible to prevent a drop in write speed.

Next, a specific example of a write method selection process 1403 will be explained.

Figure 19:
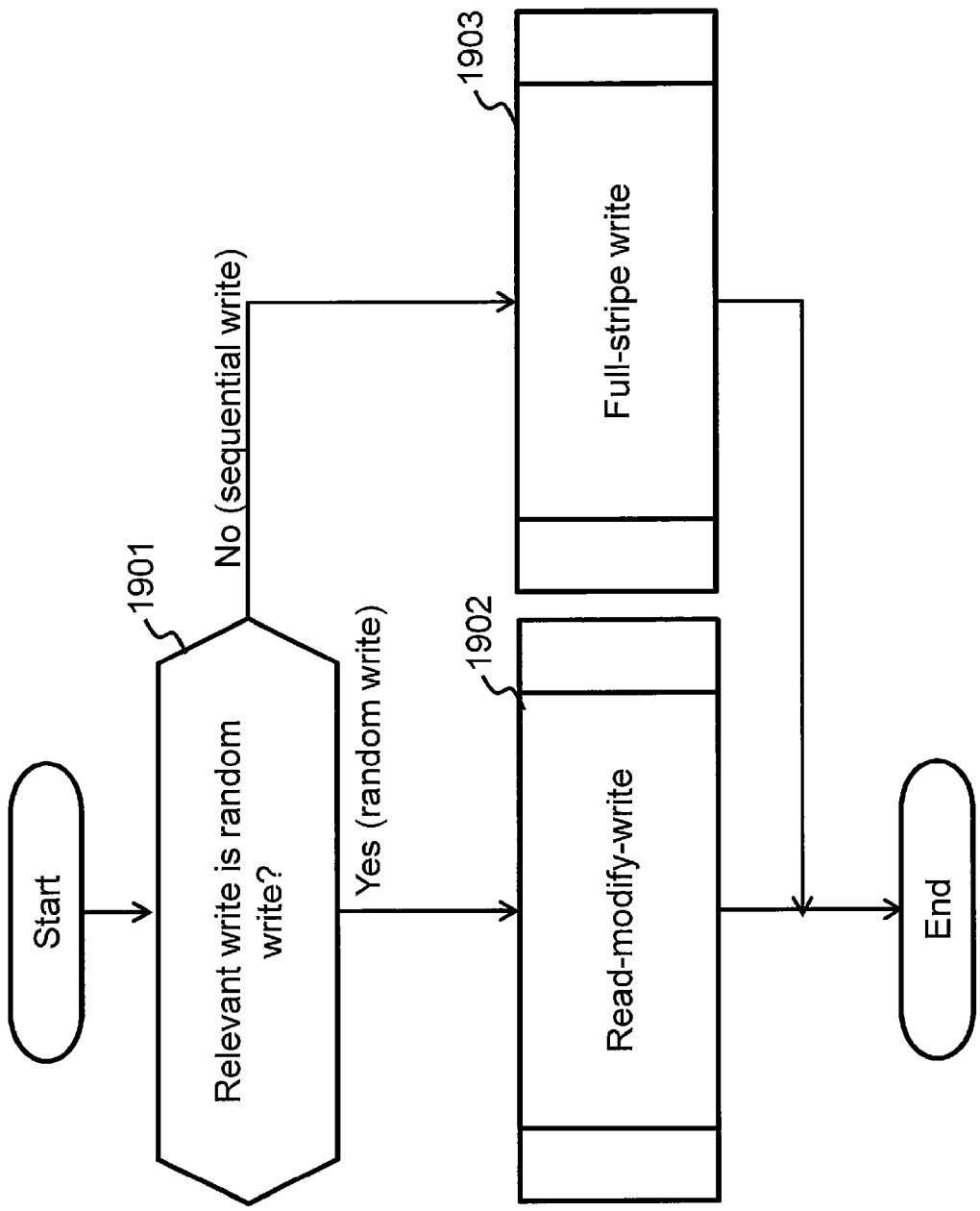
FIG. 19 shows an example of a write method selection process 1403.

FIG. 19 shows an example of a write method selection process 1403. The write method choices, for example, are read-modify-write and full-stripe write. First, the system controller 20 determines whether or not the IO pattern of a write, which is the relevant IO request, is a random write (1901). In a case where it is determined that the IO pattern is a random write (1901: Yes), the system controller 20 selects a read-modify-write as the write method (1902), and ends the flow of processing. Alternatively, in a case where it is determined that the IO pattern is not a random write (1901: No), that is, a case where it is determined that the IO pattern is a sequential write, the system controller 20 selects the full-stripe write as the write method (1903), and ends the flow of processing.

Next, a number of specific examples of a data update process 1404, which corresponds to the selection result of the parity operation implementation apparatus and the selection result of the write method, will be explained.

First, a first read-modify-write process, which is a specific example of the data update process 1404 in a case where the device controller 60 has been selected as the parity operation implementation apparatus and the read-modify-write has been selected as the write method, will be explained.

Figure 20:
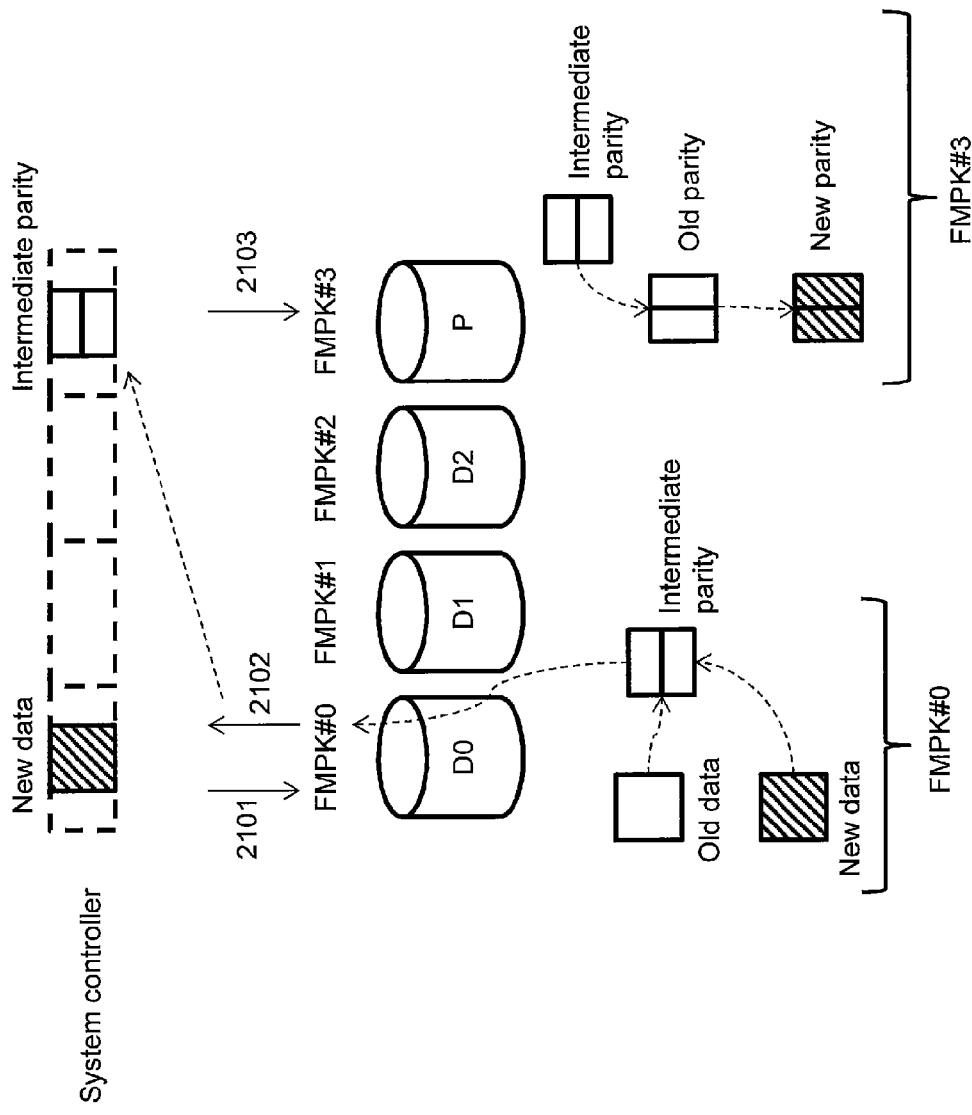
FIG. 20 shows an example of a first read-modify-write process.
Figure 21:
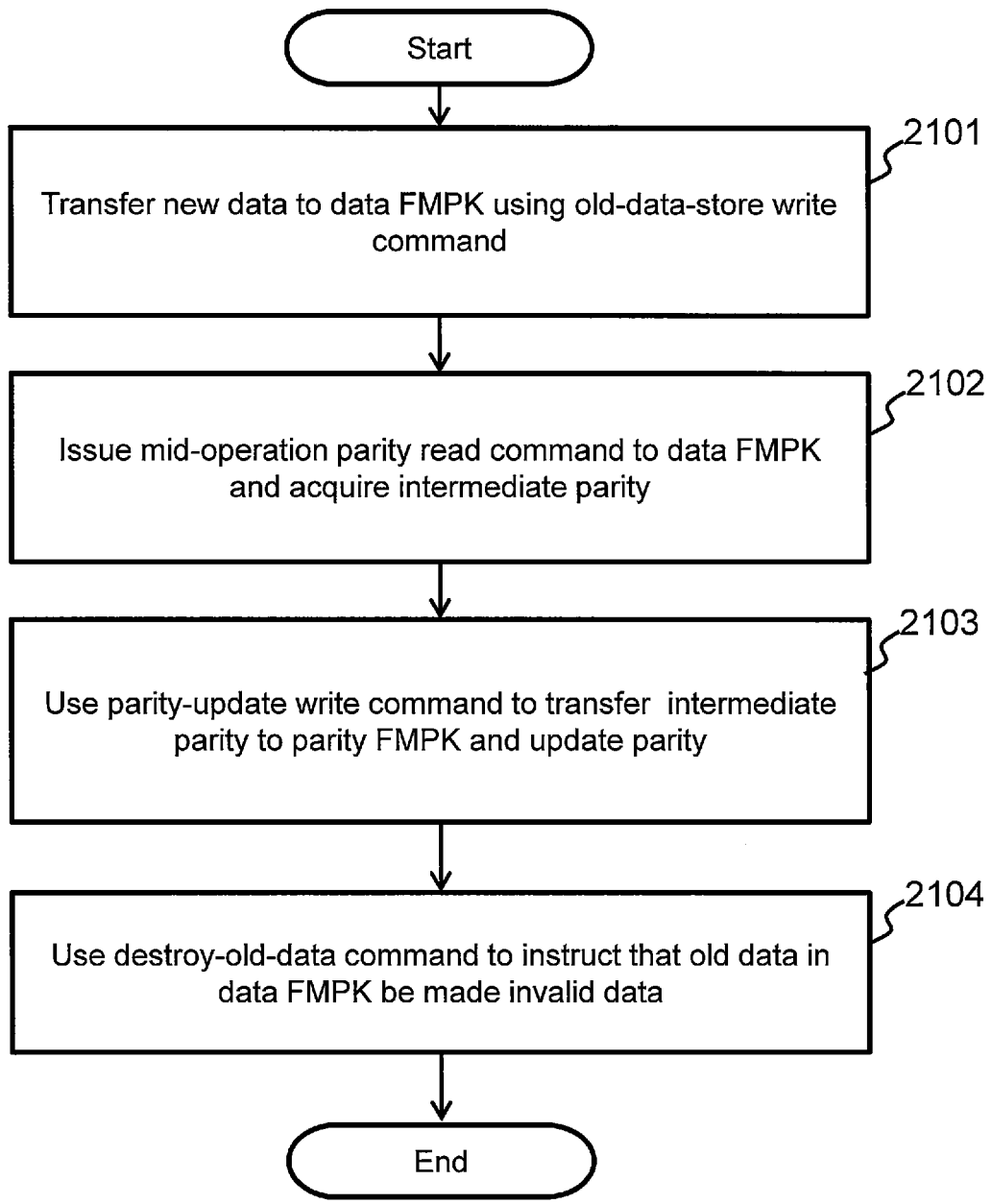
FIG. 21 shows an example of the operation of the storage controller 20 in the first read-modify-write process.

FIG. 20 shows an example of the first read-modify-write process. FIG. 21 shows an example of the operation of the system controller 20 in the first read-modify-write process. In this example, four FMPKs 50, i.e., FMPKs #0, #1, #2, and #3, respectively store the data D0, D1, D2 and a parity P in one stripe line. It is supposed here that an initial state is a state in which the system controller 20 has received new data for updating the old data of D0 in accordance with a write command. In the following explanation, of the FMPKs #0, #1, #2, and #3, the FMPK #0, which stores the data to be updated, may be called the data FMPK. In addition, of the FMPKs #0, #1, #2, and #3, the FMPK #3, which stores parity, may be called the parity FMPK.

First, the system controller 20 selects the FMPK #0 (the data FMPK) corresponding to the D0 from among the FMPKs #0, #1, #2 and #3, and transfers new data to the FMPK #0 in accordance with issuing the FMPK #0 an old-data-store write command, which instructs that the old data be stored and the new data be written (2101). The device controller 60 of the FMPK #0, which receives this command, writes the new data from the system controller 20 to a different physical page from the physical page of the old data in the FMPK #0. With a normal write command, the old physical page becomes invalid when a new physical page is allocated to the logical page, and the old data stored in the old physical page becomes the target of an erase. Consequently, the system controller 20 uses an old-data-store write command instead of a normal write command to make sure the old data is retained until the parity update is complete. In subsequent explanation, the write command means a normal write command.

Next, the system controller 20 acquires a intermediate parity from the FMPK #0 in accordance with issuing the FMPK #0 a intermediate parity read command requesting the intermediate parity (2102). The mid-operation parity is a intermediate operation result for producing a new parity in accordance with a parity operation on the old parity. The device controller 60 of the FMPK #0, which receives this command, computes the intermediate parity based on the old data stored in the FMPK #0 and the new data stored in the FMPK #0, and sends the intermediate parity to the system controller 20 as a response. The FMPK #0 device controller 60 may write the computed intermediate parity to the buffer 66 here, or may write the computed intermediate parity to a different physical page from either the old data physical page or the new data physical page in the FM 55 of the FMPK #0.

Next, the system controller 20 selects the FMPK #3 (the parity FMPK), which corresponds to the P from among the FMPKs #0, #1, #2 and #3, and transfers the intermediate parity received from the FMPK #0 to the FMPK #3 in accordance with issuing the FMPK #3 a parity-update write command instructing that parity be updated (2103). The FMPK #3, which receives this command, computes a new parity based on the old parity in the FMPK #3 and the intermediate parity from the system controller 20, and writes the new parity to the FMPK #3. The FMPK #3 device controller 60 writes the new parity to the FMPK #3 and notifies the system controller 20 of the completion response for the parity update write. At this point, the FMPK #3 device controller 60 may write the intermediate parity from the system controller 20 to the buffer 66, or may write the intermediate parity to a physical page, which differs from both the old parity physical page and the new parity physical page in the FM 55 inside the FMPK #3.

Next, the system controller 20, upon receiving a completion response from the FMPK #3, issues the FMPK #0 a unmap-old-data command instructing that the old data be invalidated (2104), and ends this flow. The device controller 60 of the FMPK #0, which receives this command, deletes the physical page mapped to the logical page identified by the unmap-old-data command from the mapping management table 1100 in order to invalidate the stored old data.

Furthermore, the system controller 20, in a case where the completion response has not been received from the FMPK #3 within a prescribed period of time subsequent to the issuing of the parity update write command, may determine that the parity update has failed, re-acquire the intermediate parity from the FMPK #0, and re-execute the parity update process by re-transferring this intermediate parity to the FMPK #3.

Specifically, the system controller 20, in a case where the completion response has not been received from the FMPK #3 within a prescribed period of time following the issuing of the parity update write command, re-issues the intermediate parity read command to the FMPK #0, and receives the intermediate parity re-computed in accordance with this command. Then, the system controller 20 writes the re-computed intermediate parity to the FMPK #3 in accordance with re-issuing the parity update write command to the FMPK #3.

According to this processing, the transfer of data between the system controller 20 and the device controller 60 in the updating of data in a single stripe block is as follows.

(1) Post-update data is transferred from the system controller 20 to the device controller 60 of the data FMPK.

(2) Intermediate parity is transferred from the device controller 60 of the data FMPK to the system controller 20.

(3) Intermediate parity is transferred from the system controller 20 to the device controller 60 of the parity FMPK.

This makes it possible to hold down on the transfer of data between the system controller 20 and the device controller 60. Alternatively, in a case where the system controller 20 performs the parity operation here, the transfer of data between the system controller 20 and the device controller 60 is as follows.

(1) Pre-update data is transferred from the device controller 60 of the data FMPK to the system controller 20.

(2) Pre-update parity is transferred from the device controller 60 of the parity FMPK to the system controller 20.

(3) Post-update data is transferred from the system controller 20 to the device controller 60 of the data FMPK.

(4) Post-update parity is transferred from the system controller 20 to the device controller 60 of the parity FMPK.

Less data is transferred in the first read-modify-write process than in a case where the system controller 20 performs this kind of parity operation.

Also, the buffer 66, which the data FMPK device controller 60 used to perform an operation on the mid-operation parity can be pared down in accordance with the data FMPK storing both the pre-update data and the post-update data in the FM 55.

In addition, storing the old data until parity is updated even after new data has been written also makes data restoration possible in a case where a failure has occurred prior to parity being updated. Furthermore, making the old data invalid and targeting the old data for an erase subsequent to parity being updated makes it possible to reduce the amount of storage area being used by old data.

Next, a second read-modify-write process, which is another specific example of a different data update process 1404 in a case where the device controller 60 has been selected as the parity operation implementation apparatus and read-modify-write has been selected as the write method, will be explained.

Figure 22:
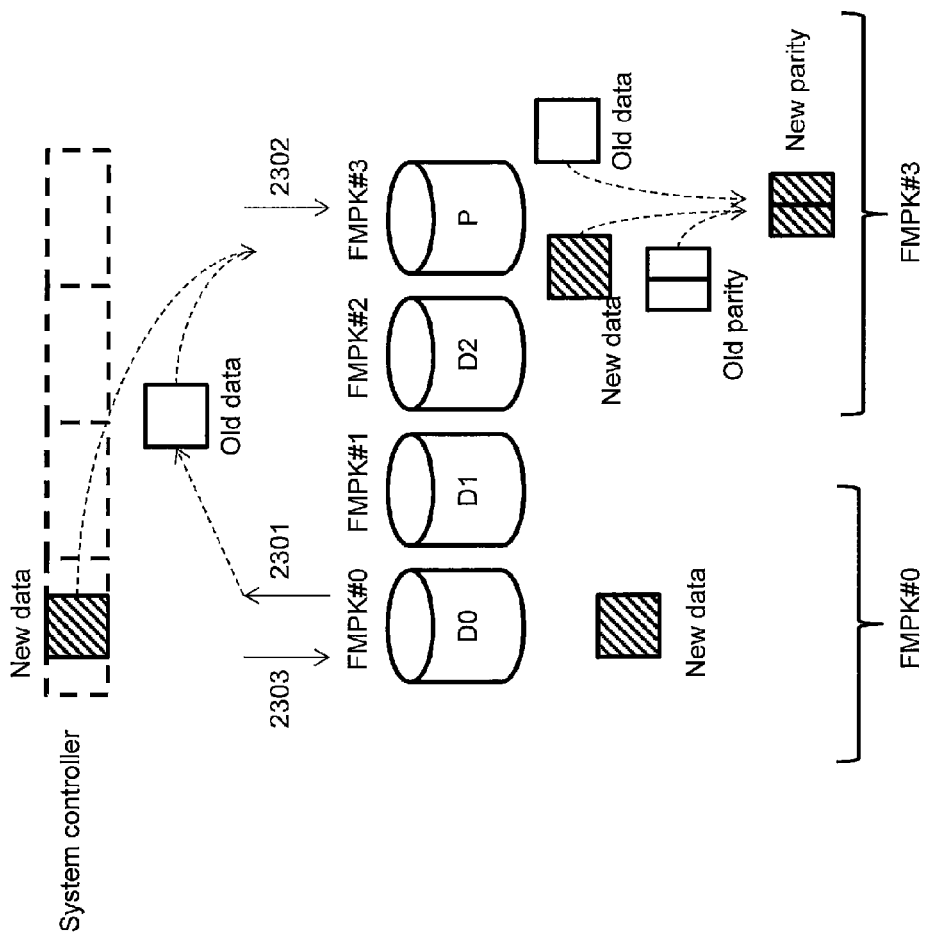
FIG. 22 shows an example of a second read-modify-write process.
Figure 23:
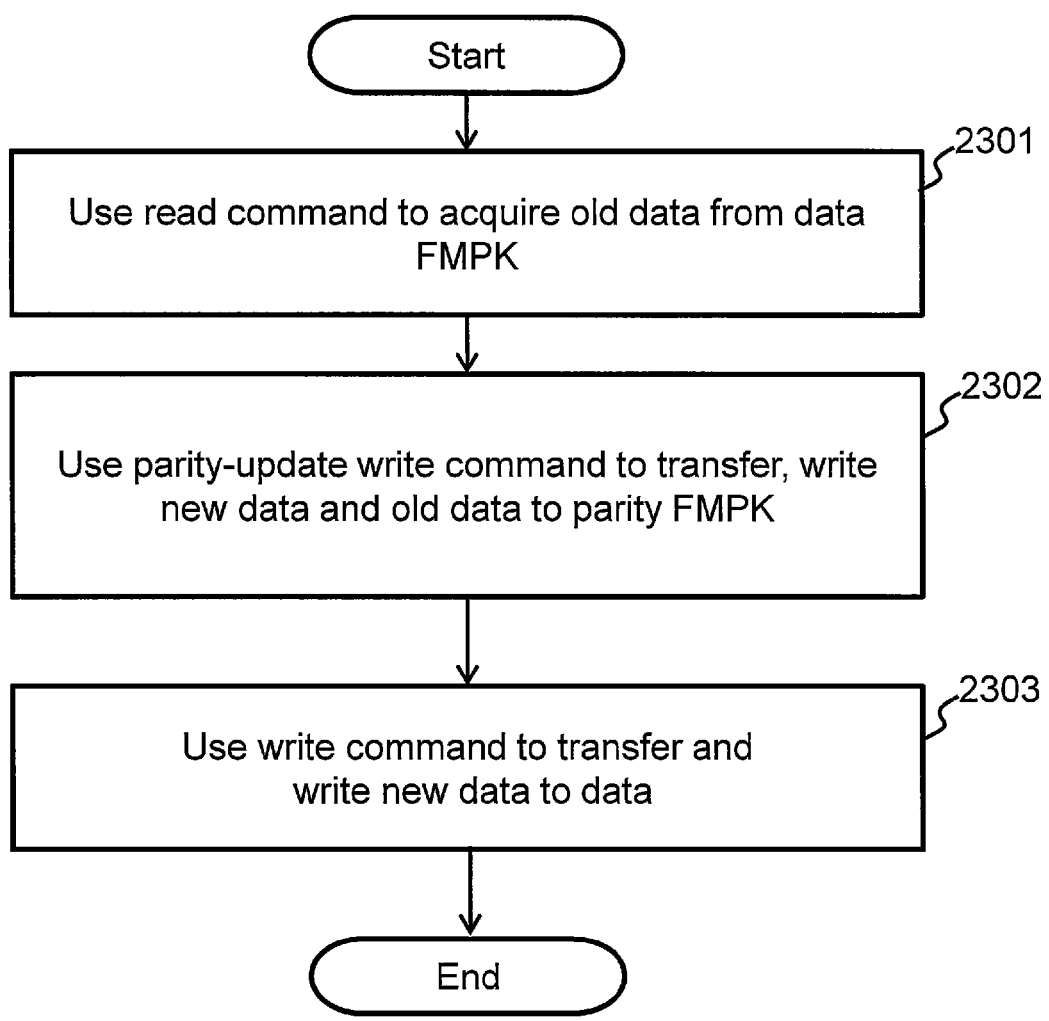
FIG. 23 shows an example of the operation of the storage controller 20 in the second read-modify-write process.

FIG. 22 shows an example of the second read-modify-write process. FIG. 23 shows an example of the operation of the system controller 20 in the second read-modify-write process. The initial state in this example is the same as the initial state of the first read-modify-write process. First, the system controller 20 acquires the old data from the FMPK #0 in accordance with issuing a read command to the FMPK #0 corresponding to the D0 (the data FMPK) (2301). The device controller 60 of the FMPK #0, which receives this command, reads the old data in the FMPK #0 and sends the old data to the system controller 20 as a response.

Next, the system controller 20 transfers the old data and new data to the FMPK #3 in accordance with issuing a parity-update write command to the FMPK #3 corresponding to the P (the parity FMPK) (2302). The device controller 60 of the FMPK #3, which receives this command, computes a new parity based on the new data from the system controller 20, the old data from the system controller 20, and the old parity in the FMPK #3, and writes the new parity to the FMPK #3.

Next, the system controller 20 transfers the new data to the FMPK #0 in accordance with issuing a write command to the FMPK #0 (2303). The device controller 60 of the FMPK #0, which receives this command, writes the new data to the FMPK #0.

According to this processing, the transfer of data between the system controller 20 and the device controller 60 in the updating of data in a single stripe block is as follows.

(1) Pre-update data is transferred to the system controller 20 from the data FMPK device controller 60, and post-update data is transferred from the system controller 20 to the data the device controller 60 of the data FMPK.

(2) Pre-update data and post-update data are transferred from the system controller 20 to the parity FMPK device controller 60.

This makes it possible to hold down on the transfer of data between the system controller 20 and the device controller 60.

In 2302, the system controller 20 transfers new data and old data to the parity FMPK using a single parity-update write command. The amount of transfer data at this time is two times the amount of data transferred in the case of the first read-modify-write process when the intermediate parity is transferred to the parity FMPK from the system controller 20. However, since there is only one transfer, it is possible to prevent an increase in the data transfer overhead. In a case where the data transfer is performed in accordance with a high-speed interface such as a 6 GB SAS (Serial Attached Small Computer Interface), the merit of the small number of transfers outweighs the demerit of the increase in the amount of data transferred.

In addition, storing the old data until parity is updated even after new data has been written also makes data restoration possible in a case where a failure has occurred prior to parity being updated. Furthermore, making the old data invalid and targeting the old data for an erase subsequent to parity being updated makes it possible to reduce the amount of storage area being used by old data.

In a case where the device controller 60 has been selected as the parity operation implementation apparatus, and the read-modify-write has been selected as the write method, either the first read-modify-write process or the second read-modify-write process may be performed.

Next, a third read-modify-write process, which is a specific example of the data update process 1404 in a case where the system controller 20 has been selected as the parity operation implementation apparatus and read-modify-write has been selected as the write method, will be explained.

Figure 24:
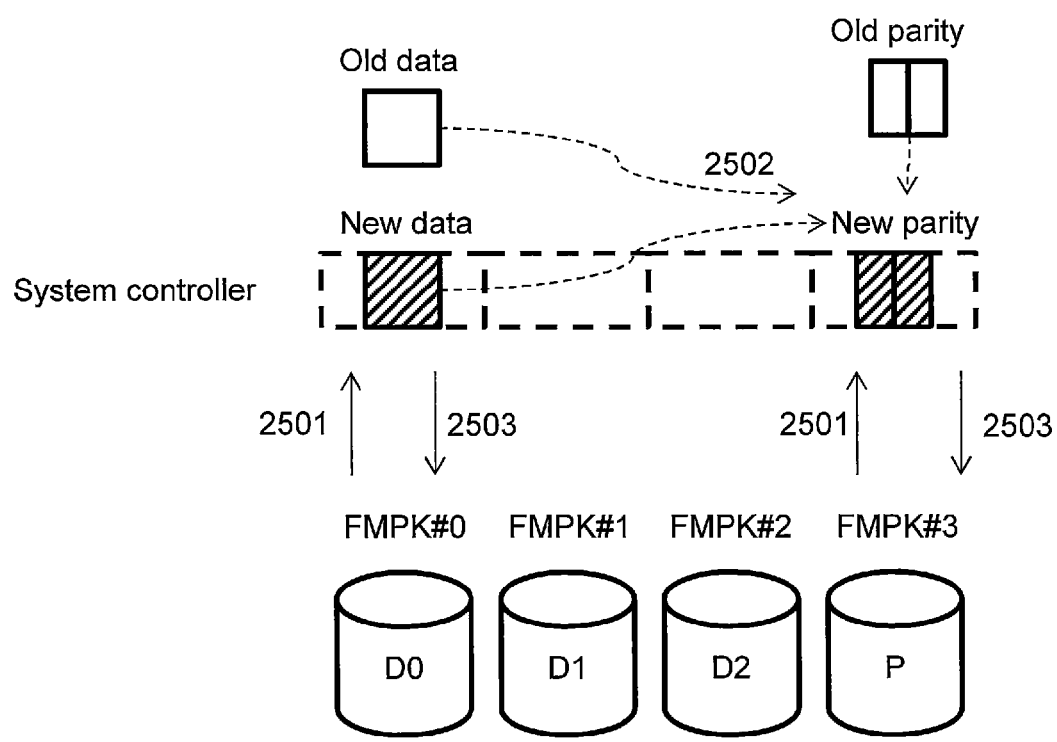
FIG. 24 shows an example of a third read-modify-write process.
Figure 25:
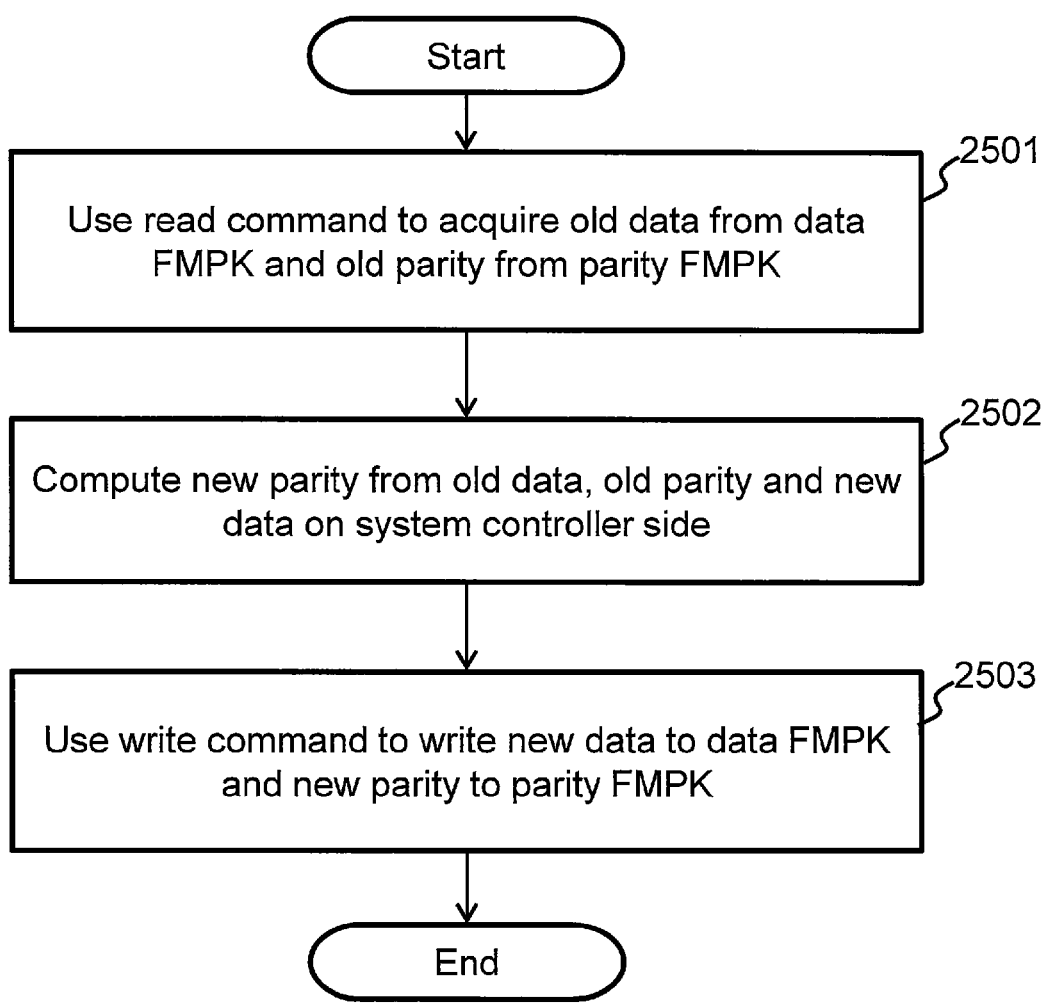
FIG. 25 shows an example of the operation of the storage controller 20 in the third read-modify-write process.

FIG. 24 shows an example of the third read-modify-write process. FIG. 25 shows an example of the operation of the system controller 20 in the third read-modify-write process. The initial state in this example is the same as the initial state of the first read-modify-write process. First, the system controller 20 acquires old data from the FMPK #0 in accordance with issuing a read command requesting the D0 to the FMPK #0 corresponding to the D0, and acquires old parity from the FMPK #3 in accordance with issuing a read command to the FMPK #3 corresponding to the P (2501). The FMPK #0, which receives this read command, reads the old data of the FMPK #0, and sends this old data to the system controller 20 as a response. Also, the device controller 60 of the FMPK #3, which receives this read command, reads the old parity of the FMPK #3 and sends this old parity to the system controller 20 as a response.

Next, the system controller 20 computes a new parity based on the old data, the old parity, and the new data (2502). Next, the system controller 20 sends the new data to the FMPK #0 in accordance with issuing a write command to the FMPK #0, sends the new parity to the FMPK #3 in accordance with issuing a write command to the FMPK #3 corresponding to the P (2503), and ends this flow of processing. The device controller 60 of the FMPK #0, which receives this write command, writes the new data to the FMPK #0. In addition, the FMPK #3, which receives this write command, writes the new parity to the FMPK #3.

According to this processing, the transfer of data between the system controller 20 and the device controller 60 in the updating of the data in a single stripe block is as follows.

(1) Pre-update data is transferred from the device controller 60 of the data FMPK to the system controller 20 and post-update data is transferred from the system controller 20 to the device controller 60 of the data FMPK.

(2) Pre-update parity is transferred from the device controller 60 of the parity FMPK to the system controller 20.

(3) Post-update parity is transferred from the system controller 20 to the device controller 60 of the parity FMPK.

This makes it possible to hold down on the transfer of data between the system controller 20 and the device controller 60.

Next, a number of specific examples of a full-stripe write will be explained.

First, a first full-stripe write process, which is a specific example of another data update process 1404 in a case where the device controller 60 has been selected as the parity operation implementation apparatus and full-stripe write has been selected as the write method.

Figure 26:
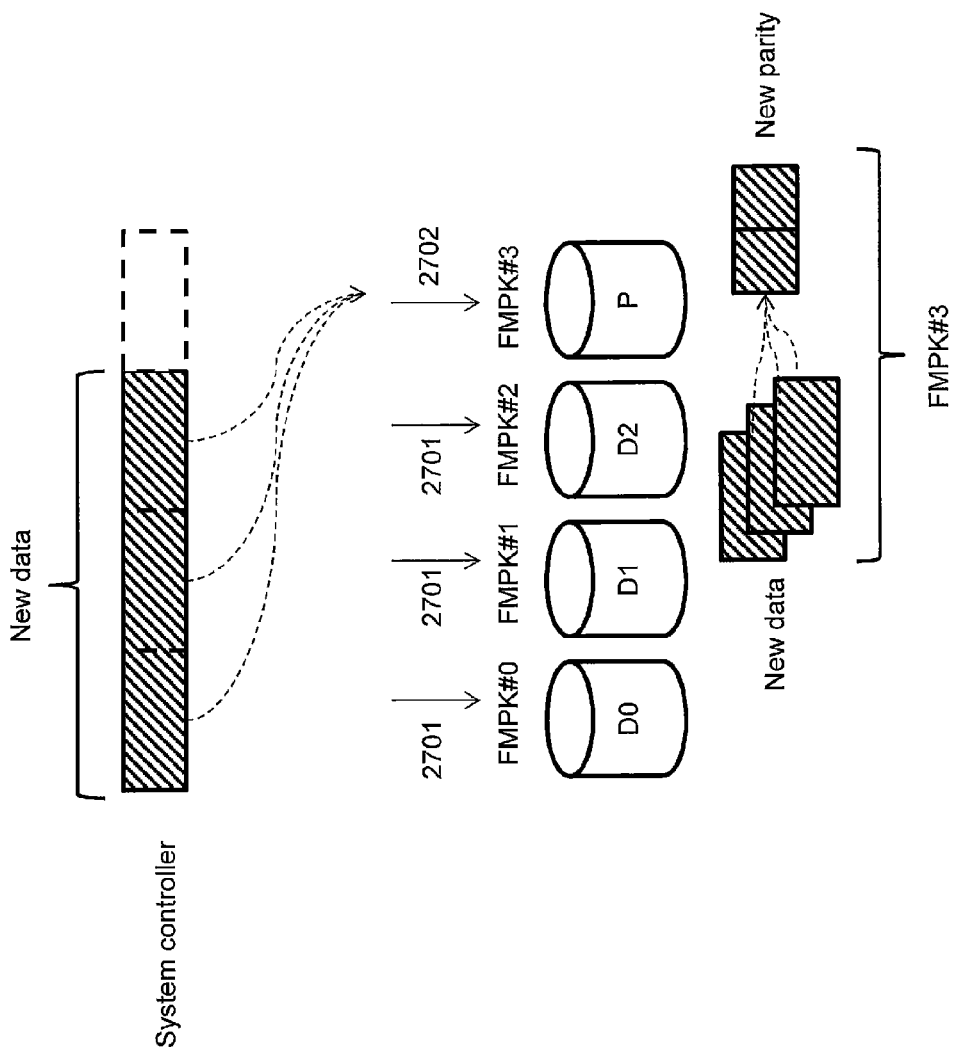
FIG. 26 shows an example of a first full-stripe write process.
Figure 27:
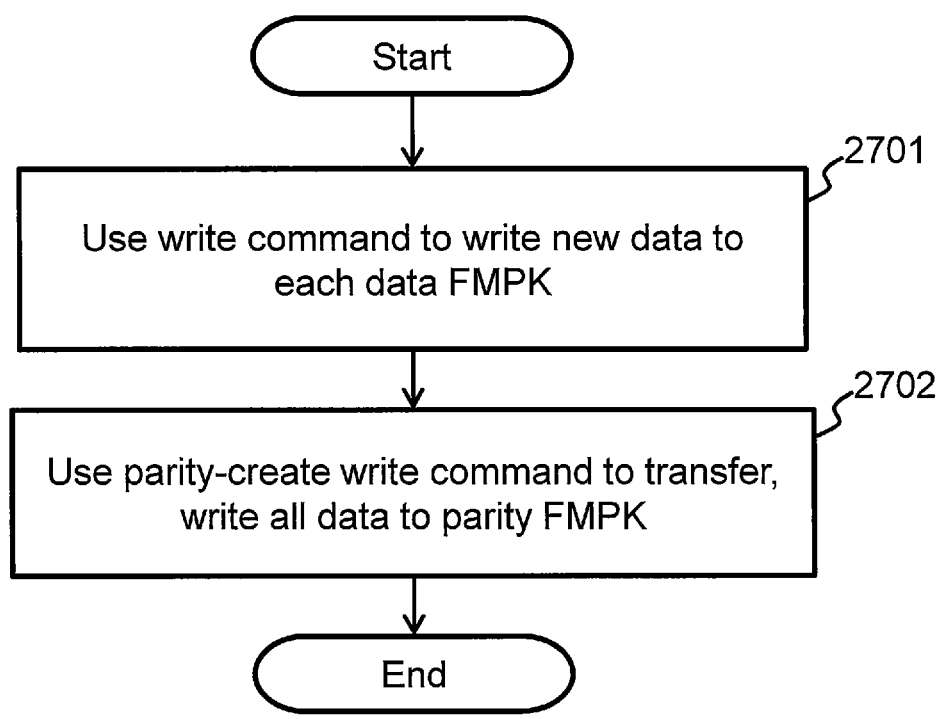
FIG. 27 shows an example of the operation of the storage controller 20 in the first full-stripe write process.

FIG. 26 shows an example of the first full-stripe write process. FIG. 27 shows an example of the operation of the system controller 20 in the first full-stripe write process. In this example, the FMPKs #0, #1, #2, and #3 respectively store D0, D1, D2 and P. It is supposed here that the initial state is a state in which the system controller 20 has received new data for updating the old data of D0, D1, and D2 in accordance with a write command. In the following explanation, of the FMPKs #0, #1, #2 and #3, the FMPKs #0, #1 and #2, which are storing the data to be updated, may be called the data FMPK.

First, the system controller 20 partitions the received data into new data for D0, D1, and D2 and respectively transfers the new data of D0, D1, and D2 to the FMPKs #0, #1, and #2 in accordance with issuing a write command to the FMPKs #0, #1 and #2 (the data FMPKs) respectively corresponding to the D0, the D1, and the D2 (2701). The device controllers 60 of the FMPKs #0, #1, and #2, which receive this write command, respectively write the new data from the system controller 20 to the FMPKS #0, #1 and #2.

Next, the system controller 20 transfers the new data of the D0, the D1, and the D2 to the FMPK #3 in accordance with issuing the FMPK #3 corresponding to the P (the parity FMPK) a parity-create write command instructing the creation and writing of a parity (2702), and ends the flow of processing. The device controller 60 of the FMPK #3, which receives this write command, computes a new parity based on the new data of the D0, the D1, and the D2, and writes this new parity to the FMPK #3.

According to this processing, the transfer of data between the system controller 20 and the device controllers 60 in the updating of data in a single stripe line is as follows.

(1) Post-update data is transferred from the system controller 20 to the data FMPK device controllers 60.

(2) Post-update parity data is transferred from the system controller 20 to the parity FMPK device controller 60.

This makes it possible to hold down on the transfer of data between the system controller 20 and the device controller 60.

Next, a second full-stripe write process, which is a specific example of another data update process 1404 in a case where the system controller 20 has been selected as the parity operation implementation apparatus and the full-stripe write has been selected as the write process, will be explained.

Figure 28:
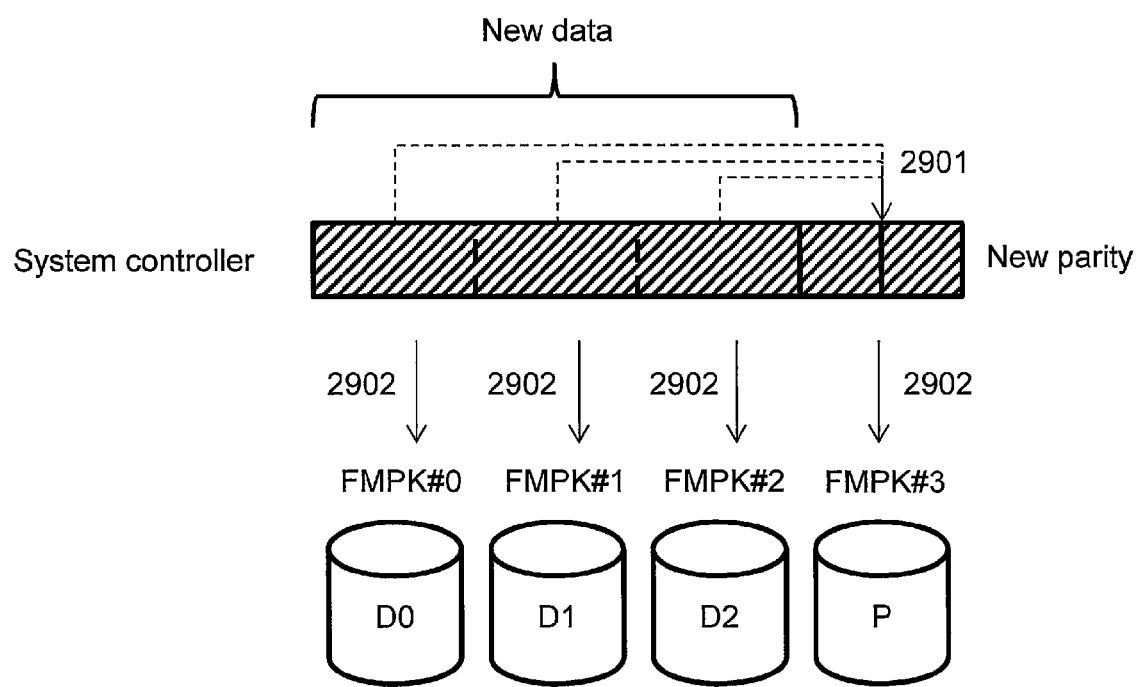
FIG. 28 shows an example of a second full-stripe write process.
Figure 29:
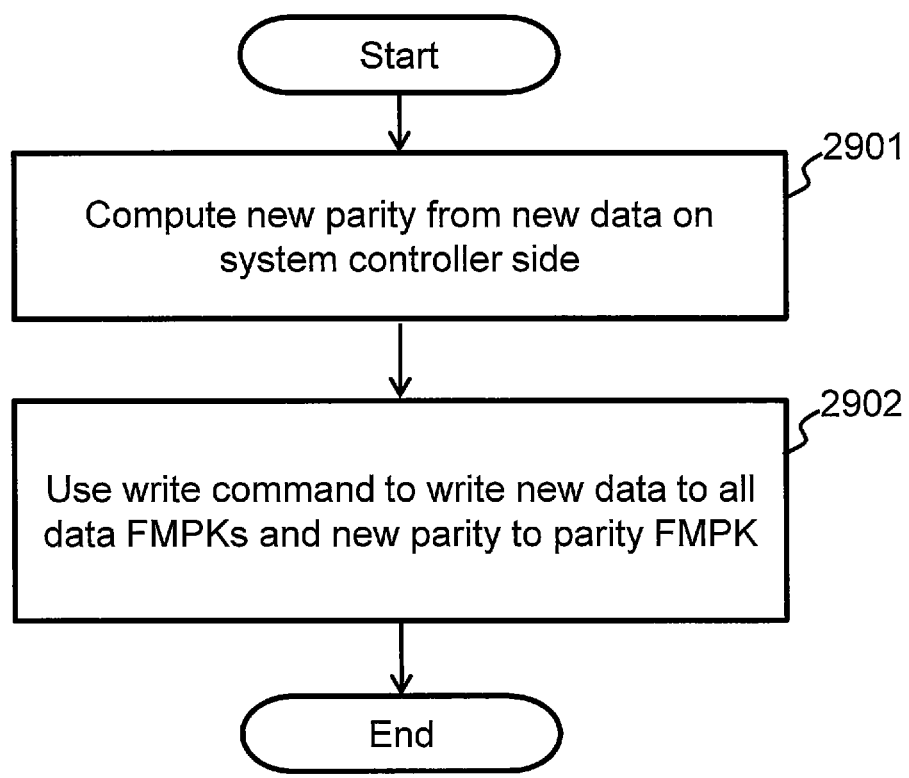
FIG. 29 shows an example of the operation of the storage controller 20 in the second full-stripe write process.

FIG. 28 shows an example of the second full-stripe write process. FIG. 29 shows an example of the operation of the system controller 20 in the second full-stripe write process. The initial state in this example is the same as the initial state of the first full-stripe write process. First, the system controller 20 computes a new parity from the new data of the D0, the D1, and the D2 (2901). Next, the system controller 20 respectively transfers the new data of the D0, the D1, and the D2 to the FMPKs #0, #1, and #2 in accordance with issuing a write command to the FMPKs #0, #1, and #2 corresponding to the D0, the D1, and the D2, transfers the computed new parity to the FMPK #3 in accordance with issuing a write command to the FMPK #3 corresponding to the P (2902), and ends this flow of processing. The device controllers 60 of the FMPKs #0, #1, and #2, which receive this write command, respectively write the new data from the system controller 20 to the FMPKS #0, #1 and #2. In addition, the device controller 60 of the FMPK #3, which receives the write command, writes the new parity from the system controller 20 to the FMPK #3.

According to this processing, the transfer of data between the system controller 20 and the device controllers 60 in the updating of the data in a single stripe line is as follows.

(1) Post-update data is transferred from the system controller 20 to the data FMPK device controllers 60.

(2) Post-update parity is transferred from the system controller 20 to the parity FMPK device controller 60.

This makes it possible to hold down on the transfer of data between the system controller 20 and the device controller 60.

Next, a number of specific examples of a data restoration process in accordance with the parity operation implementation apparatus selection result will be explained.

First, a first data restoration process, which is a specific example of a data restoration process in a case where the device controller 60 has been selected as the parity operation implementation apparatus, will be explained.

Figure 30:
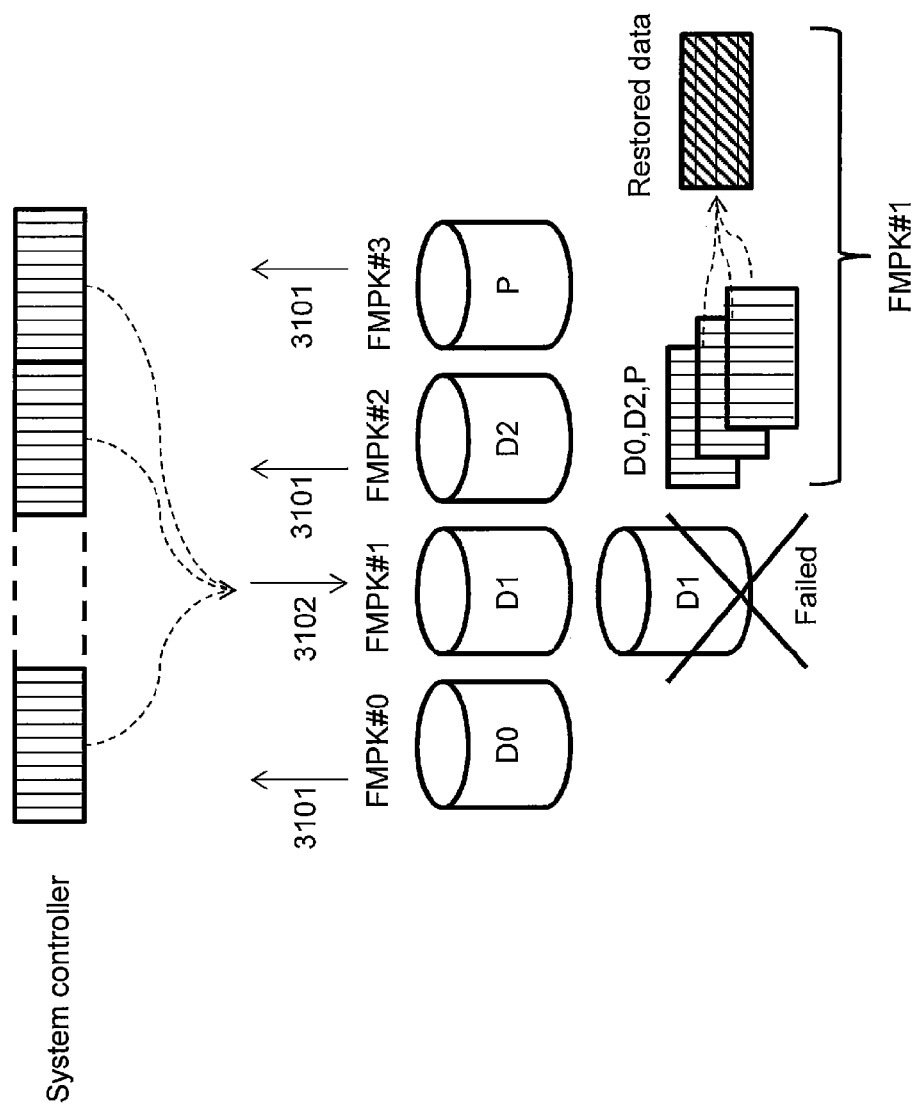
FIG. 30 shows an example of a first data restoration process.
Figure 31:
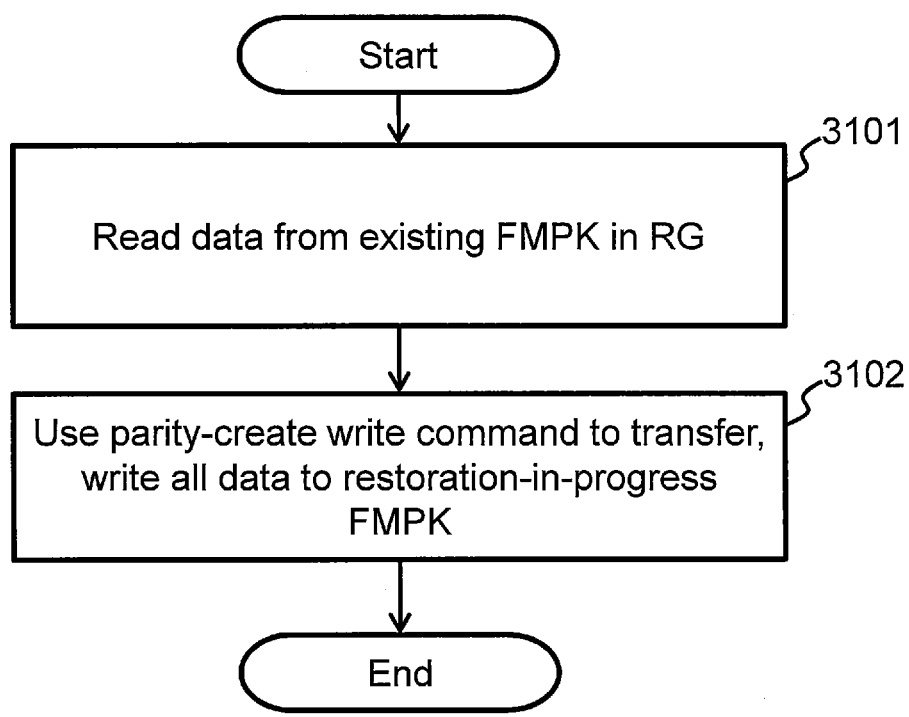
FIG. 31 shows an example of the operation of the storage controller 20 in the first data restoration process.

FIG. 30 shows an example of the first data restoration process. FIG. 31 shows an example of the operation of the system controller 20 in the first data restoration process. In this example, the FMPKs #0, #1, #2, and #3 respectively store the D0, the D1, the D2, and the P. It is supposed here that the initial state is a state in which a failure has occurred in the FM 55 inside the FMPK #1, and this FM 55 has been replaced with a new FM 55. In the following explanation, of the FMPKS #0, #1, #2, and #3, the FMPK #1, which is storing the data to be restored, may be called the restoration-in-progress FMPK.

First, the system controller 20 acquires the D0, the D2, and the P respectively stored in the FMPKs #0, #2, and #3 in accordance with issuing a read command to the FMPKs #0, #2 and #3, which exist in the RG to which the FMPKs #0, #1, #2, and #3 belong (3101). The device controllers 60 of the FMPKs #0, #2, and #3, which receives this read command, respectively read the D0, the D2, and the P, and transfer the read D0, D2, and P to the system controller 20. Data and parity may be read here.

Next, the system controller 20 transfers the D0, the D2, and the P, which have been read, to the FMPK #1 in accordance with issuing a write command denoting the creation of parity to the FMPK #1, which is being restored (the restoration-in-progress FMPK) (3102), and ends this flow of processing. The device controller 60 of the FMPK #1, which receives this write command, creates D1 restored data in accordance with computing the D1 based on the D0, the D2, and the P, and writes the D1 restored data to the FMPK #1.

According to this processing, the transfer of data between the system controller 20 and the device controller 60 in the restoration of data in a single stripe block is as follows.

(1) Data of a FMPK 50 other than the restoration-in-progress FMPK is transferred from the corresponding device controller 60 to the system controller 20.

(2) Transferred data is transferred from the system controller 20 to the restoration-in-progress FMPK device controller 60.

This makes it possible to hold down on the transfer of data between the system controller 20 and the device controller 60.

Next, a second data restoration process, which is a specific example of a data restoration process in a case where the system controller 20 has been selected as the parity operation implementation apparatus, will be explained.

Figure 32:
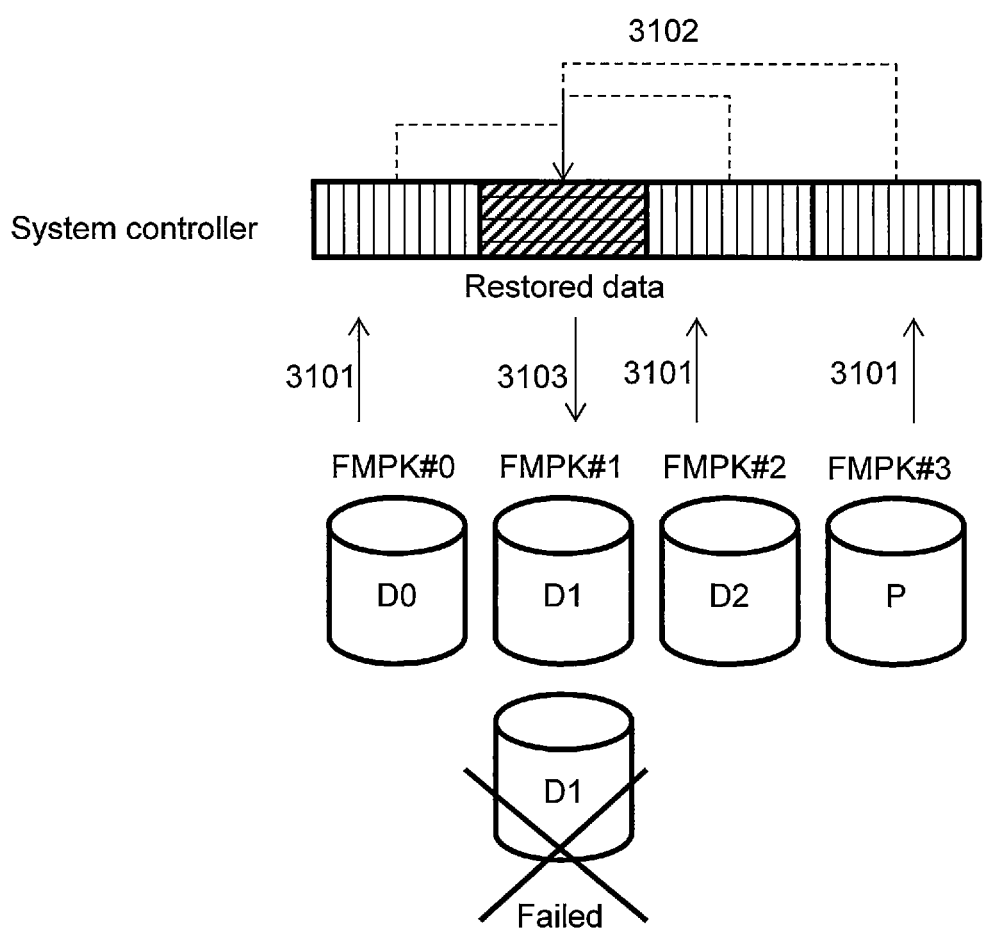
FIG. 32 shows an example of a second data restoration process.
Figure 33:
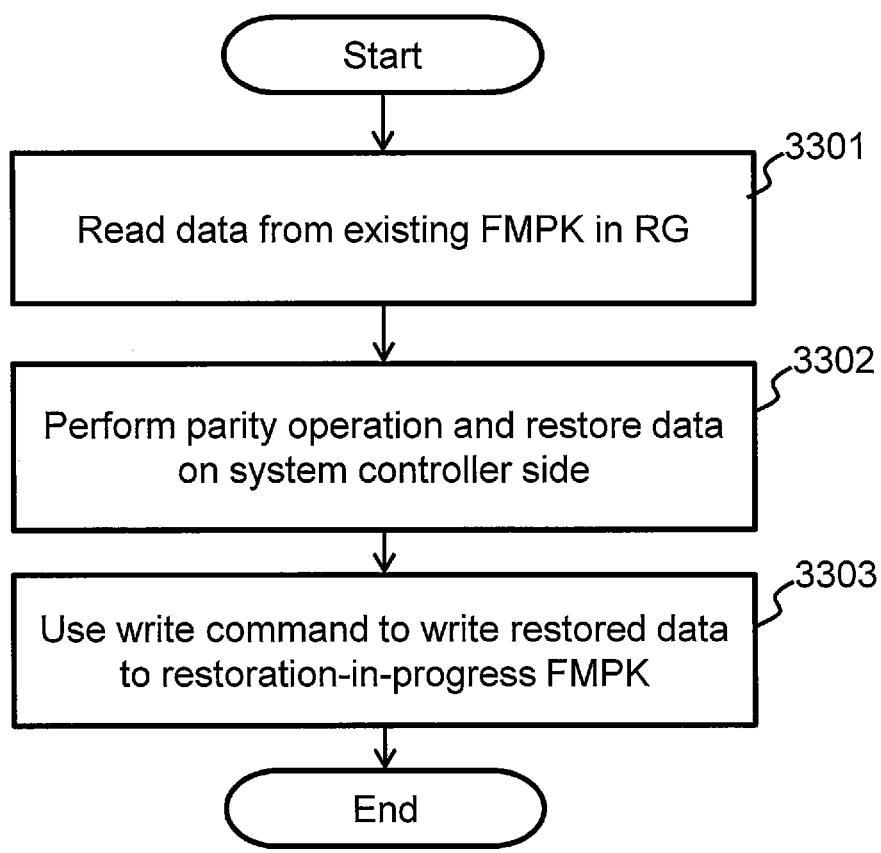
FIG. 33 shows an example of the operation of the storage controller 20 in the second data restoration process.

FIG. 32 shows an example of the second data restoration process. FIG. 33 shows an example of the operation of the system controller 20 in the second data restoration process. The initial state in this example is the same as that of the first specific example. First, the system controller 20 reads the D0, the D2, and the P from the FMPKs #0, #2, and #3 in accordance with issuing a read command to the FMPKs #0, #2 and #3, which exist in the RG to which the FMPKs #0, #1, #2, and #3 belong (3301). The device controllers 60 of the FMPKs #0, #2, and #3, which receive this read command, respectively read the D0, the D2, and the P, and transfer the read D0, D2, and P to the system controller 20. Data and parity may be read here.

Next, the system controller 20 creates D1 restored data in accordance with computing the D1 based on the D0, the D2, and the P (3302). Next, the system controller 20 writes the restored D1 to the FMPK #1 in accordance with issuing a write command to the FMPK #1 (3303), and ends this flow of processing. The device controller 60 of the FMPK #1, which receives this write command, writes the received D1 to the FMPK #1.

According to this processing, the transfer of data between the system controller 20 and the device controller 60 in the restoration of data in a single stripe block is as follows.

(1) Data of a FMPK 50 other than the restoration-in-progress FMPK is transferred from the corresponding device controller 60 to the system controller 20.

(2) The transferred data is transferred from the system controller 20 to the restoration-in-progress FMPK device controller 60.

This makes it possible to hold down on the transfer of data between the system controller 20 and the device controller 60.

Next, the operation of the device controller 60 will be explained.

First, a normal write process, which is a specific example of a process of the device controller 60 in a case where a normal write command has been received, will be explained.

In this normal write process, the device controller 60 does not need to store old data.

Figure 34:
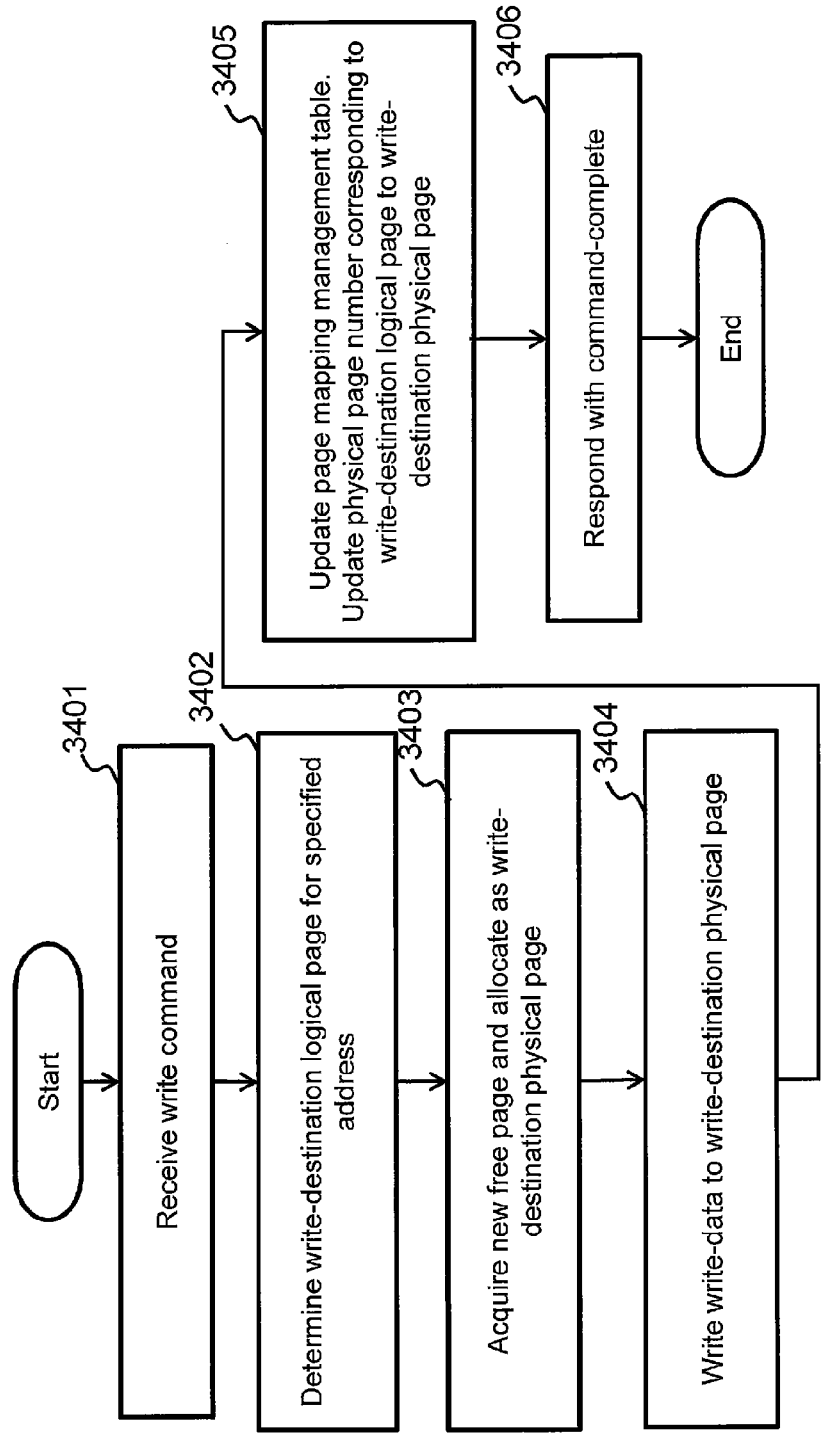
FIG. 34 shows an example of the processing of a device controller 60 in accordance with a normal write command.

FIG. 34 shows an example of a normal write process. First, the device controller 60 receives a normal write command (3401). Next, the device controller 60 determines a logical page number from the logical address specified in this write command, and makes the logical page of this logical page number the write-destination logical page (3402). Next, the device controller 60 acquires a new free page, and allocates the acquired physical page as a write-destination physical page (3403). Next, the device controller 60 writes write-data received in accordance with the write command to the write-destination physical page (3404).

Next, the device controller 60 associates the write-destination physical page with the write-destination logical page in the page mapping management table 1100, and registers the number of the write-destination physical page as the physical page number (3405). Next, the device controller 60 sends a response denoting the command has been completed to the system controller 20 (3406), and ends this flow of processing.

In 3403, the device controller 60 may acquire a free physical page by performing processing, such as securing an unused physical page, and erasing a physical block and securing a physical page inside this physical block. In order to erase the physical block at this time, the device controller 60 may cancel the association of an old physical page with another logical page in the page mapping management table 1100.

Next, an old-data-store write command process, which is a specific example of a process of the device controller 60 in a case where an old-data-store write command has been received, will be explained.

This old-data-store write process, for example, is used in the first read-modify-write process described hereinabove.

Figure 35:
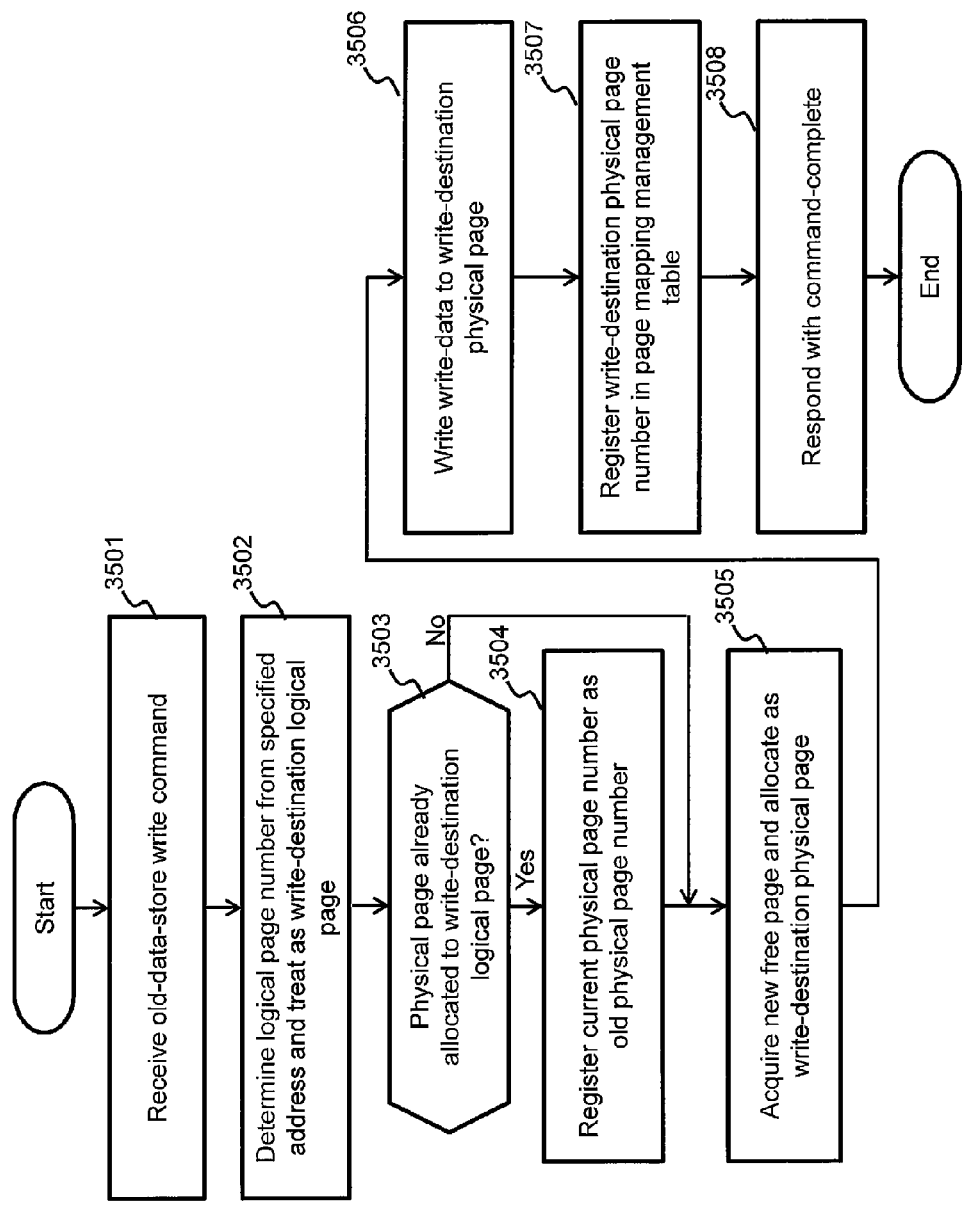
FIG. 35 shows an example of the processing of the device controller 60 in accordance with an old-data-store write command.

FIG. 35 shows an example of the old-data-store write process. First, the device controller 60 receives an old-data-store write command (3501). Next, the device controller 60 determines a logical page number on the basis of the logical address specified in this write command, and treats the logical page of this logical page number as the write-destination logical page (3502). Next, the device controller 60 determines whether or not a physical page is allocated to the write-destination logical page by referencing the page mapping management table 1100 (3503).

In a case where a physical page is allocated to the write-destination logical page (3503: Yes), the device controller 60 registers the physical page number associated with the write-destination logical page as the old physical page number in the page mapping management table 1100 (3504).

In a case where a physical page is not allocated to the write-destination logical page (3503: No), or after 3504, the device controller 60 acquires a new free page and allocates the acquired physical page as a write-destination physical page (3505). Next, the device controller 60 writes write-data received in accordance with the write command to the write-destination physical page (3506).

Next, the device controller 60 associates the write-destination physical page with the write-destination logical page in the page mapping management table 1100, and registers the number of the write-destination physical page as the physical page number (3507). Next, the device controller 60 sends a response denoting that the command has been completed to the system controller 20 (3508), and ends this flow of processing.

According to this processing, the data FMPK is able to store pre-update data at the time of a data update. In addition, the data FMPK device controller 60 is able to associate an updated logical page, an old physical page for storing old data, and a physical page for storing new data. This makes it possible for the data FMPK to store both pre-update data and post-update data in nonvolatile memory at data update time. The data FMPK device controller 60 is also able to read both the pre-update data and the post-update data without using volatile memory. In addition, the system controller 20 is able to let the data FMPK device controller 60 store both the pre-update data and the post-update data.

Next, a intermediate parity process, which is a specific example of a process of the device controller 60 in a case where a intermediate parity command has been received, will be explained.

This intermediate parity process creates and returns a intermediate parity in accordance with performing a parity operation on the old data of the specified address and new data. This intermediate parity process, for example, is used in the first read-modify-write process described hereinabove.

Figure 36:
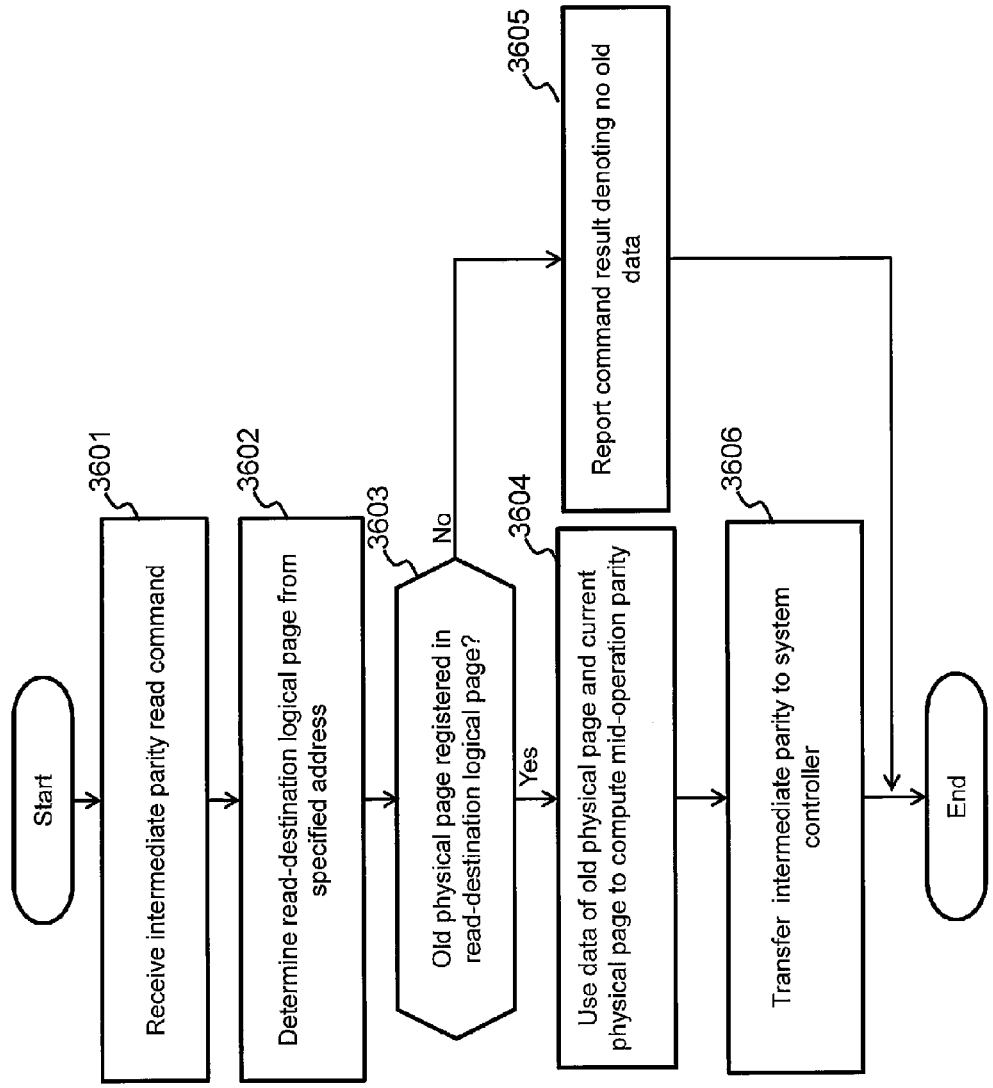
FIG. 36 shows an example of the processing of the device controller 60 in accordance with a intermediate parity read command.

FIG. 36 shows an example of the intermediate parity process. First, the device controller 60 receives a intermediate parity command (3601). Next, the device controller 60 determines a logical page number on the basis of the logical address specified by this read command, and treats the logical page of this logical page number as the read-destination logical page (3602). Next, the device controller 60 determines whether or not an old physical page corresponding to the read-destination logical page is registered by referencing the page mapping management table 1100 (3603).

In a case where an old physical page corresponding to the read-destination logical page is registered (3603: Yes), the device controller 60 reads data of the old physical page corresponding to the read-destination logical page, and data of the current physical page, and computes the intermediate parity from the read data (3604). Next, the device controller 60 transfers the intermediate parity to the system controller 20 (3606) and ends this flow of processing.

In 3603, in a case where an old physical page corresponding to the read-destination logical page is not registered (3603: No), the device controller 60 reports to the system controller 20 with a command result denoting that there is no old data in the read-destination logical page (3605), and ends this flow of processing.

The system controller 20, which receives the result in 3605 denoting that there is no old data in the read-destination logical page, for example, may read all the data in the same stripe line as the new data, compute a new parity on the basis of the read data, and issue a write command for writing the new parity to the device controller 60 corresponding to the parity. Or, in accordance with this, the system controller 20, for example, may read all the data in the same stripe line as the new data, and issue a parity-create write command for computing a new parity on the basis of the read data to the device controller 60 corresponding to the parity.

According to this processing, the data FMPK device controller 60, upon receiving an instruction for a intermediate parity operation from the system controller 20, can read pre-update data and post-update data and create a intermediate parity based on the read data. In addition, the system controller 20 can let the data FMPK device controller 60 create the intermediate parity, and can acquire the intermediate parity from the device controller 60.

Hypothetically, it is supposed that the data FMPK device controller 60 has created a intermediate parity asynchronously with the operation of the system controller 20. In this case, the performance of this device controller 60 drops as a result of the operation of the intermediate parity putting a burden on the buffer 66 of the device controller 60. In a case where the power shuts off in a state in which the data required in the intermediate parity operation is stored in the buffer 66, this data could be lost and data restoration could become impossible. Alternatively, according to this example, a drop in performance in the storage system 30 can be prevented by the data FMPK device controller 60 creating a intermediate parity upon receiving the intermediate parity read command. It is also possible to prevent the loss of data required in the intermediate parity operation, and to enhance the reliability of the storage system 30.

Next, a parity-update write process, which is a specific example of a process of the device controller 60 in a case where a parity-update write command has been received, will be explained.

This parity-update write process creates a new parity and writes this new parity to the FM 55 in accordance with performing a parity operation on a transferred intermediate parity and a specified old parity. This parity-update write command, for example, is used in the first read-modify-write process described hereinabove.

Figure 37:
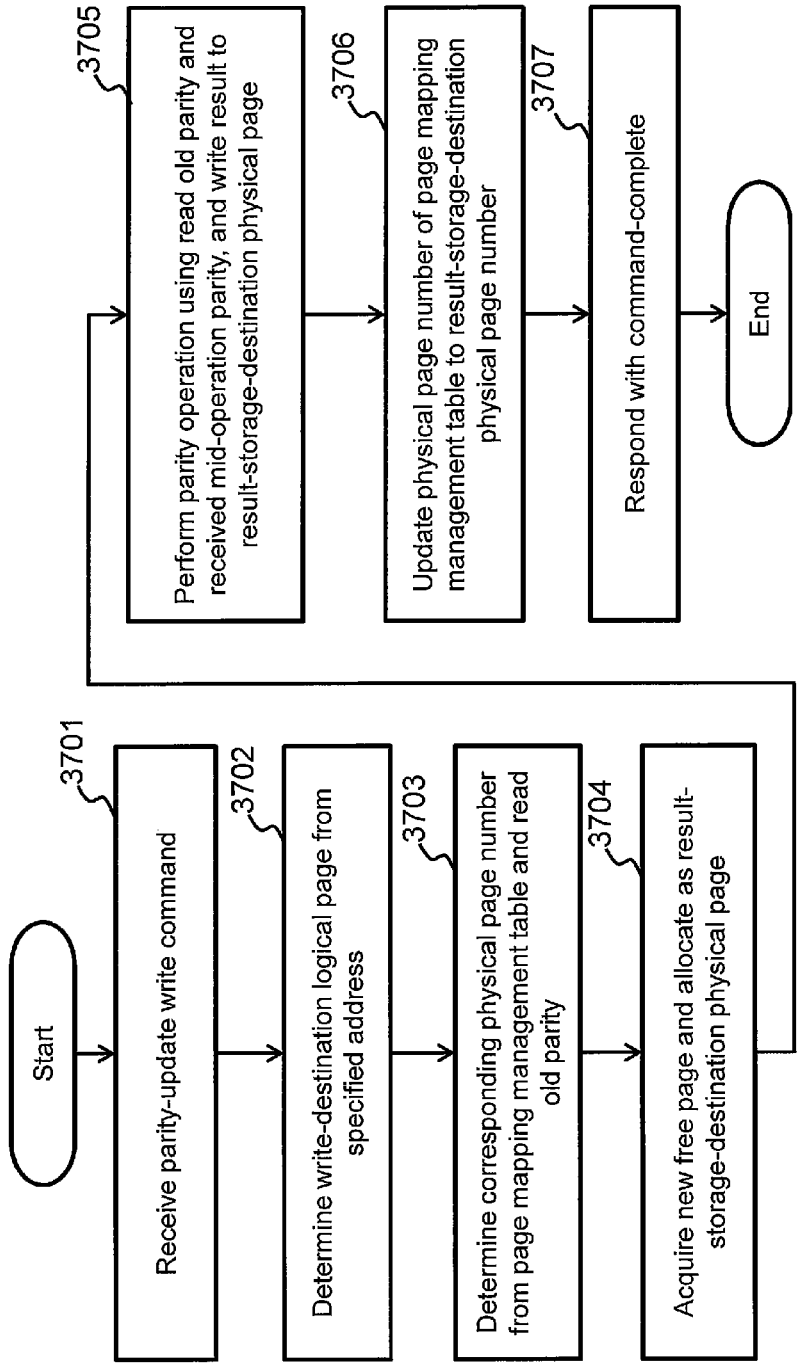
FIG. 37 shows an example of the processing of the device controller 60 in accordance with a parity-update write command.

FIG. 37 shows an example of the parity-update write process. First, the device controller 60 receives a parity-update write command (3701). Next, the device controller 60 determines a logical page number on the basis of a logical address specified in accordance with this write command, and treats the logical page of this logical page number as the read-destination logical page (3702). Next, the device controller 60 determines a physical page number corresponding to the read-destination logical page in accordance with referencing the page mapping management table 1100, and reads data from the physical page denoted by this physical page number (3703). The read data, for example, is the old parity. Next, the device controller 60 acquires a new free page, and allocates the acquired physical page as a result-storage-destination physical page (3704). Next, the device controller 60 performs a parity operation using the read data and the received data, and writes the operation result to the result-storage-destination physical page (3705).

Next, the device controller 60 associates the result-storage-destination physical page with the write-destination logical page in the page mapping management table 1100, and registers the number of the result-storage-destination physical page as the physical page number (3706). Next, the device controller 60 sends a response denoting that the command has been completed to the system controller 20 (3707), and ends this flow of processing.

According to this processing, the parity FMPK device controller 60 can compute a post-update parity on the basis of the post-update data from the system controller 20 and the pre-update parity stored in the parity FMPK, and send the post-update parity to the parity FMPK. In addition, the system controller 20 can let the parity FMPK device controller 60 create and store the post-update parity.

Next, a parity-create write process, which is a specific example of a process of the device controller 60 in a case where a parity-create write command has been received, will be explained.

This parity-create write process is a command for creating parity using data, which has been transferred from multiple stripe blocks, and writing this parity to a specified address. This parity-create write process, for example, is used in the first full-stripe write process and the data restoration process described hereinabove.

Figure 38:
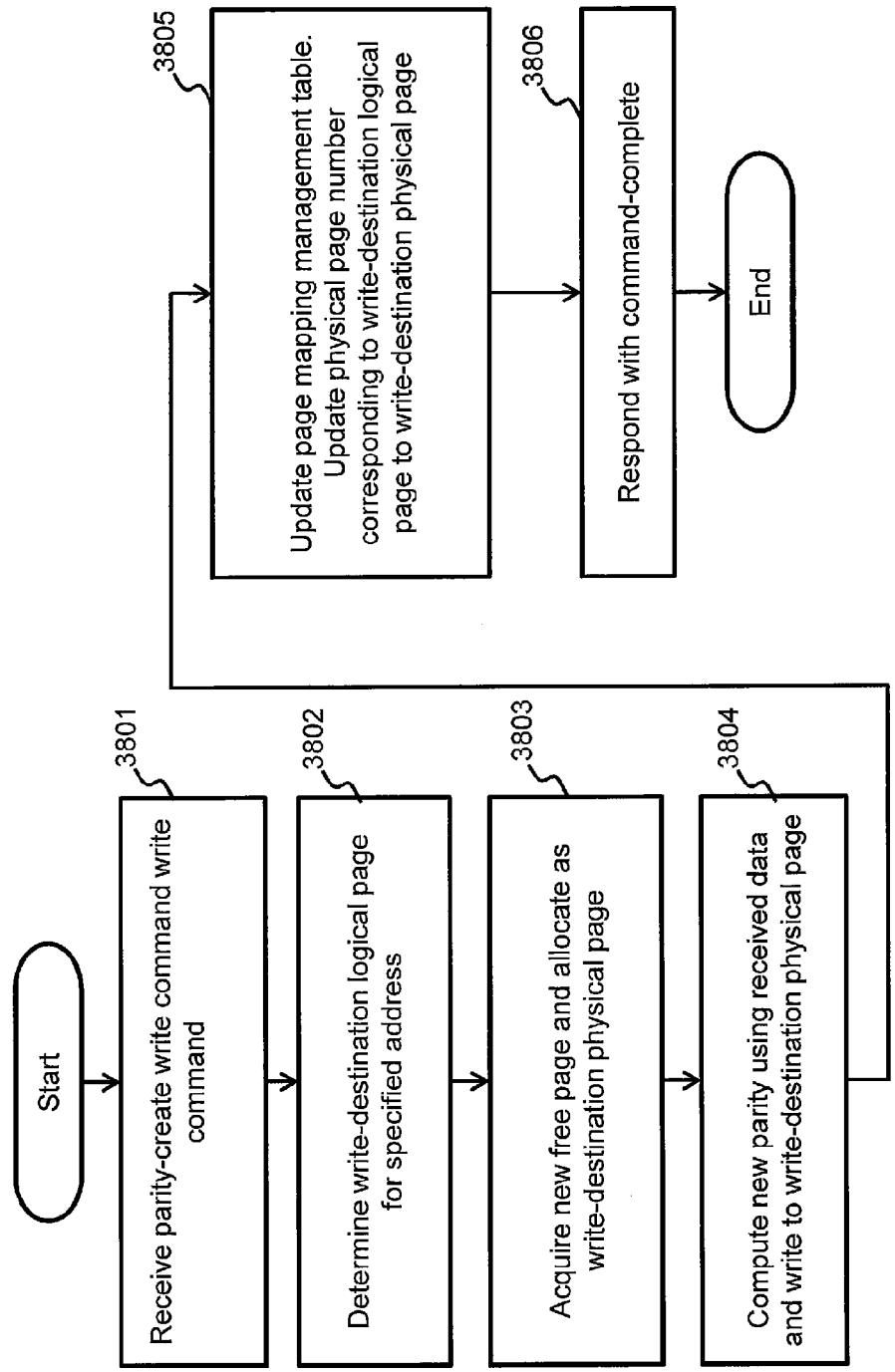
FIG. 38 shows an example of the processing of the device controller 60 in accordance with a parity-create write command.

FIG. 38 shows an example of the processing of the device controller 60 in accordance with a parity-create write command. First, the device controller 60 receives a parity-create write command (3801). Next, the device controller 60 determines a logical page number on the basis of a logical address specified by this write command, and treats the logical page of this logical page number as a write-destination logical page (3802). Next, the device controller 60 acquires a new free page, and allocates the acquired physical page as a write-destination physical page (3803). Next, the device controller 60 writes write-data received in accordance with the write command to the write-destination physical page (3804).

Next, the device controller 60 associates the write-destination physical page with the write-destination logical page in the page mapping management table 1100, and registers the number of the write-destination physical page as the physical page number (3805). Next, the device controller 60 sends a response denoting the command has been completed to the system controller 20 (3806), and ends this flow of processing.

According to this processing, the parity FMPK device controller 60 is able to compute a post-update parity on the basis of post-update data from the system controller 20, and to write the post-update parity to the parity FMPK. In addition, the system controller 20 can let the parity FMPK device controller 60 create and store the post-update parity.

Figure 39:
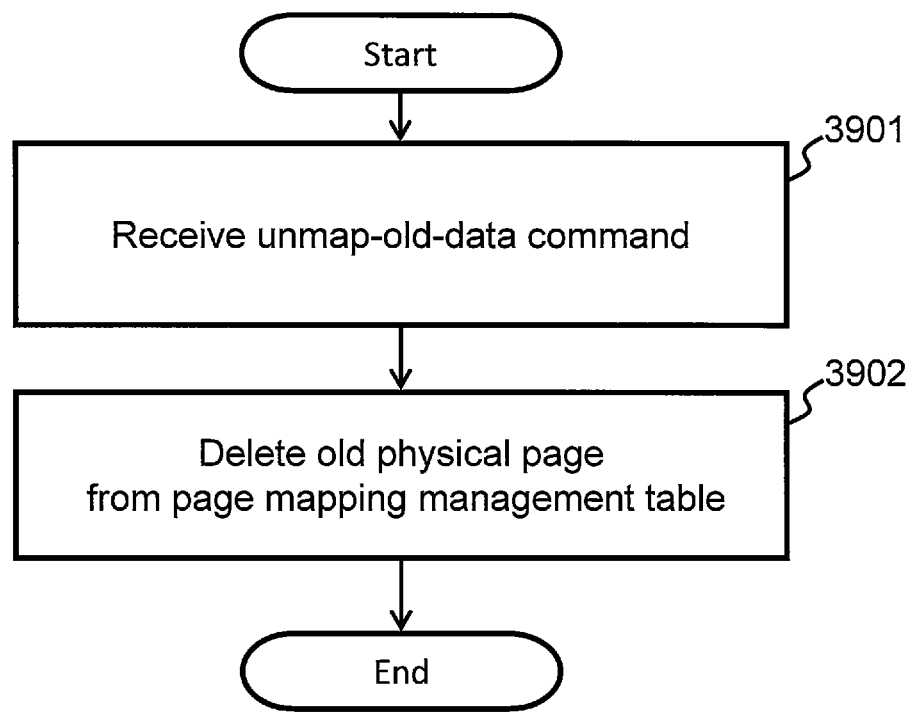
FIG. 39 shows an example of an old data unmap process by the device controller 60.

FIG. 39 shows an example of a unmap-old-data process in accordance with the device controller 60. First, the device controller 60 receives a unmap-old-data command from the system controller 20 (3901). Next, the device controller 60 determines the logical page number from the logical address specified in this unmap-old-data command, and deletes the old physical page number corresponding to this logical page number from the page mapping management table 1100 (3902). The device controller 60 does not invalidate the old data until the unmap-old-data command has been received. That is, the device controller 60 is able to store the old data without fail until parity has been updated (the unmap-old-data command has been received) even after new data has been written. Thus, keeping the old data until parity is updated makes data restoration possible even in a case where a failure has occurred prior to parity updating. Also, invalidating and targeting the old data for an erase subsequent to parity being updated makes it possible to reduce the amount of storage area being used by old data.

Example 2

In this example, a case where the system controller 20 performs RAID 6 control will be explained.

The configuration of a computer system in this example is the same as the configuration of the computer system in Example 1. Consequently, the differences with Example 1 will be explained below.

The system controller 20 performs RAID 6 control. Consequently, the difference between a RAID 5 and a RAID 6 will be explained first.

In order to expand the RAID 5 explained hereinabove to a RAID 6, either the parity circuit 25 or the parity circuit 65 performs an additional parity operation with a coefficient. It is supposed here that five FMPK 50 are respectively storing the data D0, D1, D2, and parity P and Q. In a case where A0, A1, and A2 are used as the coefficients for creating Q, P and Q are created in accordance with the following equations.

$$P = D0 + D1 + D2$$

$$Q = A0*D0 + A1*D1 + A2*D2$$

Figure 40:
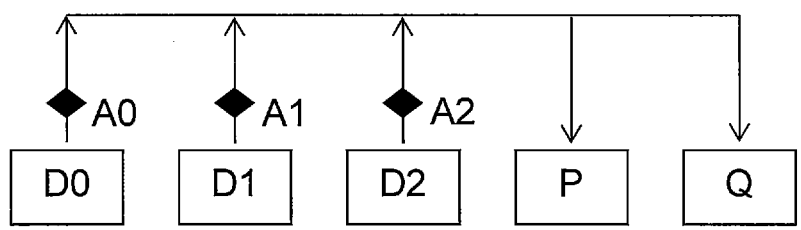
FIG. 40 shows an example of a Q-parity creation method.

FIG. 40 shows an example of a method for creating Q parity. The parity operation implementation apparatus stores A0, A1, and A2 in memory beforehand. Q is computed on the basis of D0, D1, D2, A0, A1, and A2. A computing unit, which is shown as a black diamond shape in the drawing, multiplies the coefficient attached thereto.

Solving for the P creation equation and the Q creation equation as a system of equations makes it possible to restore arbitrary data and parity when data is lost. For example, when restoring D0 and P, D0 and P can be created using the following equations.

$$D0 = A1/A0*D1 + A2/A0D2 + 1/A0*Q$$

$$P = D0 + D1 + D2$$

For example, when restoring D0 and D1, it is possible to create D0 and D1 using the following equations.

$$D0 = (A1+A2)/(A0+A1)*D2 + A1/(A0+A1)*P + 1/(A0+A1)*Q$$

$$D1 = (A0+A2)/(A0+A1)*D2 + A0(A0+A1)*P + 1/(A0+A1)*Q$$

Figure 41:
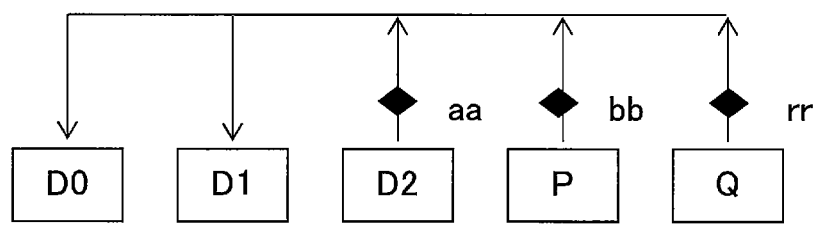
FIG. 41 shows an example of a D0, D1 restoration method.

FIG. 41 shows an example of a method for restoring D0 and D1. As shown in [0165]D0 and D1 can each be expressed as the linear equation aaD2+bbP+rrQ of D2, P and Q. The coefficients aa, bb and rr here are values based on A0, A1 and A2.

The parity operation implementation apparatus may store aa, bb and rr, which are based on A0, A1, and A2, in memory beforehand. The D0 is computed on the basis of aa, bb and rr, which are based on D2, P, Q, and A0, A1, and A2.

This example is strictly for putting forth a concept, and is actually designed for increasing processing speed and reducing the amount of memory used.

Next, a fourth read-modify-write process, which is a specific example of a data update process 1404 in a case where the device controller 60 has been selected as the parity operation implementation apparatus and the read-modify-write has been selected as the write method, will be explained.

Figure 42:
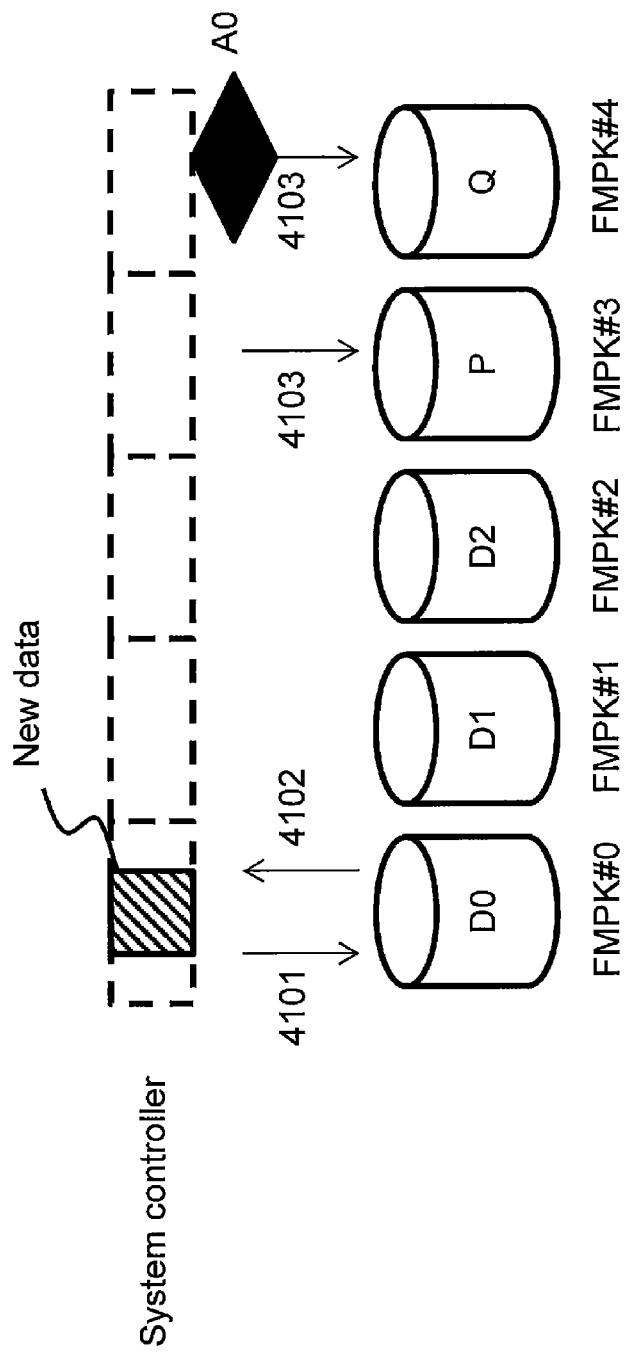
FIG. 42 shows an example of a fourth read-modify-write process.
Figure 43:
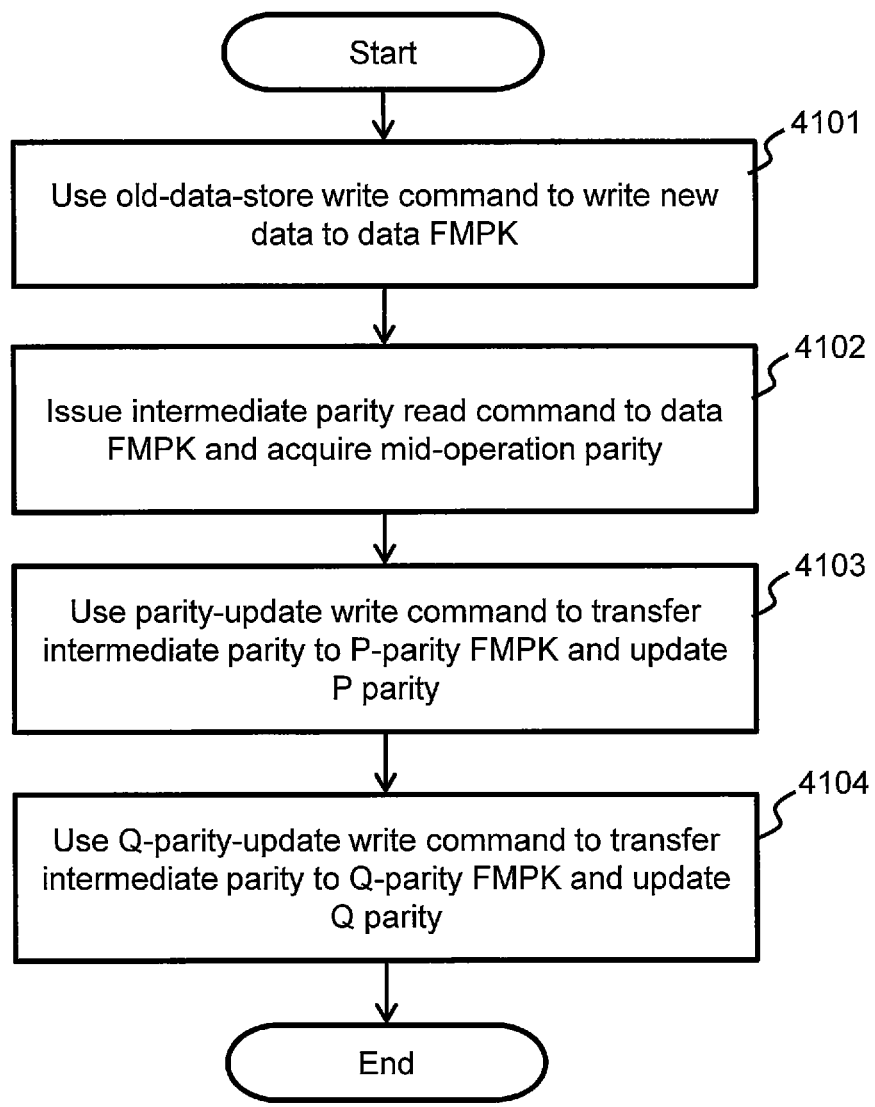
FIG. 43 shows an example of the operation of the storage controller 20 in the fourth read-modify-write process.

FIG. 42 shows an example of the fourth read-modify-write process. FIG. 42 shows an example of the operation of the system controller 20 in the fourth read-modify-write process. In this example, the FMPKs #0, #1, #2, #3, and #4 respectively store the D0, the D1, the D2, the P, and the Q. It is supposed here that the initial state is a state in which the system controller 20 receives new data for updating the old data of D0 in accordance with a write command. In the following explanation, the FMPK #0 storing the D0, which is the data to be updated, may be called the data FMPK of the FMPKs #0, #1, #2, #3, and #4. Also, the FMPK #3, which is storing the P, may be called the P-parity FMPK of the FMPKs #0, #1, #2, #3, and #4. In addition, the FMPK #4, which is storing the Q, may be called the Q-parity FMPK of the FMPKs #0, #1, #2, #3, and #4.

First, the system controller 20 writes new data to the FMPK #0 in accordance with issuing an old-data-store write command to the FMPK #0 corresponding to the D0 (the data FMPK) (4101). The device controller 60 of the FMPK #0, which receives this command, writes the new data from the system controller 20 to a physical page that is different from the old data physical page in the FMPK #0.

Next, the system controller 20 acquires a intermediate parity from the FMPK #0 in accordance with issuing a intermediate parity read command to the FMPK #0 (4102). The device controller 60 of the FMPK #0, which receives this command, computes the intermediate parity on the basis of the old data and the new data stored in the FMPK #0, and sends the intermediate parity to the system controller 20 as a response.

Next, the system controller 20 sends the intermediate parity to the FMPK #3 in accordance with issuing the same parity-update write command as in the case of RAID 5 to the FMPK #3 corresponding to the P (the P-parity FMPK) (4103). The device controller 60 of the FMPK #3, which receives this command, computes a new parity on the basis of the old parity in the FMPK #3 and the intermediate parity from the system controller 20, and writes the new parity to the FMPK #3.

The computation of a new parity P_new in a case where i is any one of 0, 1, or 2, and data Di in the relevant RG is updated to Di_new, will be explained. The same as in RAID 5, the device controller 60, which receives the parity-update write command, computes P_new on the basis of a intermediate parity (Di+Di_new) and an old parity P using the following equation.

$$P\_new = P + (Di + Di\_new)$$

The data FMPK device controller 60 computes (Di+Di_new) in accordance with the intermediate parity read command. The P-parity FMPK device controller 60 computes P+(Di+Di_new) in accordance with the parity-update write command.

Next, the system controller 20 transfers the intermediate parity to the FMPK #4 (the Q-parity FMPK) in accordance with issuing a Q-parity-update write command, which is a parity-update command for updating the Q, to the FMPK #4 corresponding to the Q (4104), and ends this flow of processing. The device controller 60 of the FMPK #4, which receives this command, computes a new parity on the basis of the old parity in the FMPK #4, the intermediate parity from the system controller 20, and the coefficient, and writes the new parity to the FMPK #3.

According to this processing, the transfer of data between the system controller 20 and the device controllers 60 in the updating of data of a single stripe block is as follows.

(1) Post-update data is transferred from the system controller 20 to the data FMPK device controller 60.

(2) Intermediate parity is transferred from the data FMPK device controller 60 to the system controller 20.

(3) Intermediate parity is transferred from the system controller 20 to the P-parity FMPK device controller 60 and the Q-parity FMPK device controller 60.

This makes it possible to hold down the transfer of data between the system controller 20 and the device controller 60.

The processing of the device controller 60, which receives the Q-parity-update write command, differs from that in the case of the parity-update write command in that a coefficient Ai, which is configured in the device controller 60 beforehand, is used. In a case where the data Di in the relevant RG is updated to Di_new, the device controller 60, which receives the Q-parity-update write command, computes a new parity Q_new on the basis of the intermediate parity (Di+Di_new), the old parity Q, and the Ai using the following equation.

$$Q\_new = Q + Ai * (Di + Di\_new)$$

The data FMPK device controller 60 computes (Di+Di_new) in accordance with the intermediate parity read command. The Q-parity FMPK device controller 60 computes Q+Ai*(Di+Di_new) in accordance with the Q-parity-update write command.

According to the parity-update write command, the P-parity FMPK device controller 60 can compute a post-update P parity on the basis of post-update data from the system controller 20 and the pre-update P parity stored in the P-parity FMPK, and write the post-update P parity to the P-parity FMPK. In addition, the system controller 20 can let the P-parity FMPK device controller 60 create and store the post-update P parity.

According to the Q-parity-update write command, the Q-parity FMPK device controller 60 can compute a post-update Q parity on the basis of post-update data from the system controller 20, the pre-update Q parity stored in the Q-parity FMPK, and a prescribed coefficient, and write the post-update Q parity to the Q-parity FMPK. In addition, the system controller 20 can let the Q-parity FMPK device controller 60 create and store the post-update Q parity.

Example 3

In this example, a computer system, which is an example of a storage system 30 application in a case where the system controller 20 does not comprise a parity operation function, will be explained.

Figure 44:
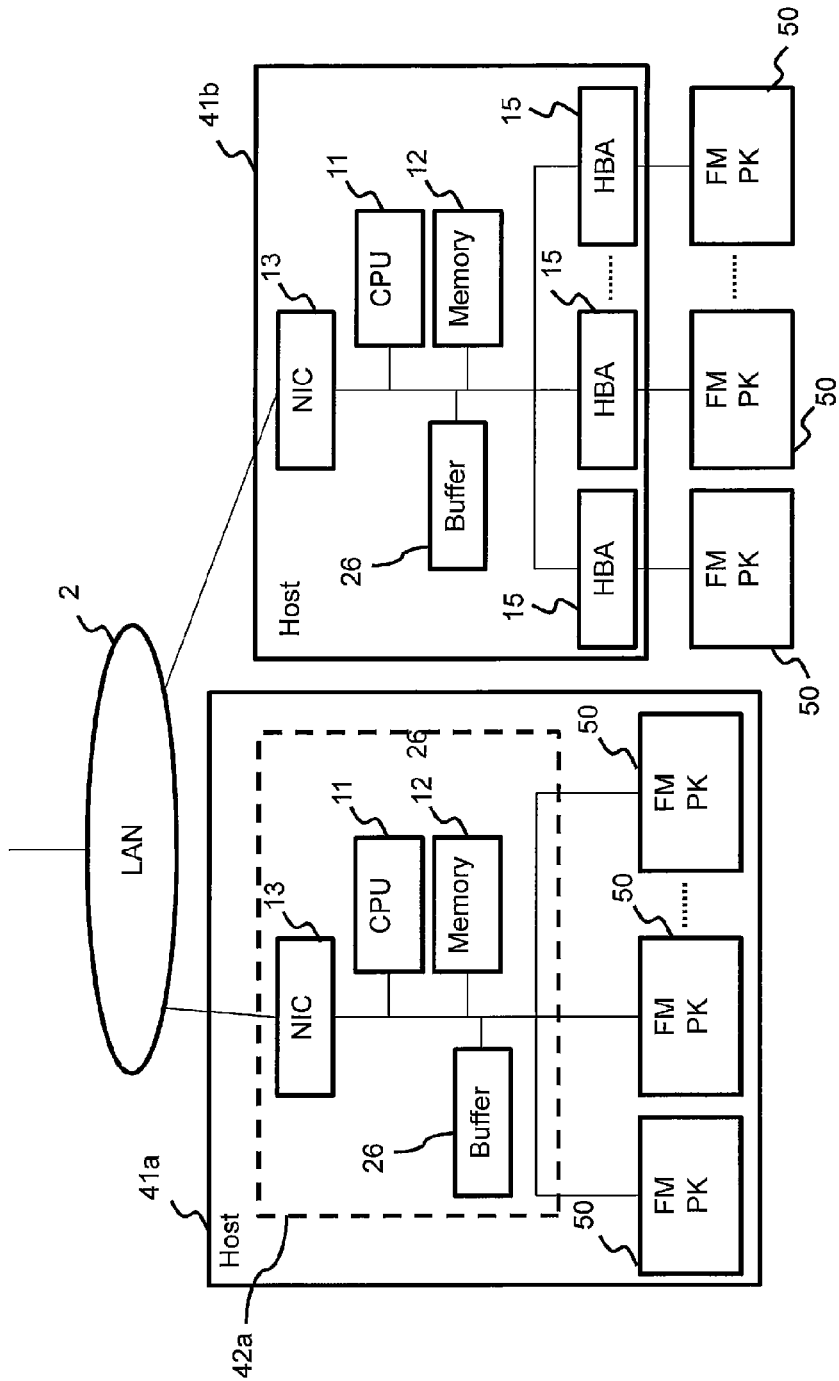
FIG. 44 shows an example of the configuration of a computer system related to Example 3.

FIG. 44 shows an example of the configuration of a computer system related to Example 3. In the computer system of this example, an element, which has been assigned the same reference sign as an element of the storage system 30, denotes either the same or an equivalent element as the element of the storage system 30. The computer system of this example comprises a host computer 41a, a host computer 41b, and multiple FMPKs 50 coupled to the host computer 41b. The host computer 41a and the host computer 41b, for example, are coupled via a LAN (Local Area Network) 2.

The host computer 41a comprises a host controller 42a, and multiple FMPKs 50 coupled to the host controller 42a. The host controller 42a comprises a NIC (Network Interface Card) 13 for coupling to a communication network such as the LAN 2, a memory 12, a CPU 11, and a buffer 26.

The host computer 41b comprises a NIC 13 for coupling to a communication network such as the LAN 2, a HBA (Host Bus Adapter) 15 for coupling to a FMPK 50, a memory 12, a CPU 11, and a buffer 26.

In the host controller 42a and the host computer 41b, the memory 12 stores a program and various types of information for controlling the FMPK 50. The CPU 11 realizes various types of functions in accordance with executing the program based on the information stored in the memory 12. Each of the host controller 42a and the host computer 41b may perform RAID control using the multiple FMPKs 50 coupled to itself.

One of the host controller 42a or the host computer 41b may carry out an IO request to the other via the LAN 2, or may carry out an IO request to its own FMPK 50.

In this example, the system controller 20 may by an aspect of either the host controller 42a or the host computer 41b.

Each of the host controller 42a and the host computer 41b correspond to either case #3 or case #4 of the method 1300 for deciding the parity operation implementation apparatus.

Example 4

Next, a third computer system, which is an example of a storage system 30 application in a case where the system controller 20 comprises a parity operation function, will be explained.

Figure 45:
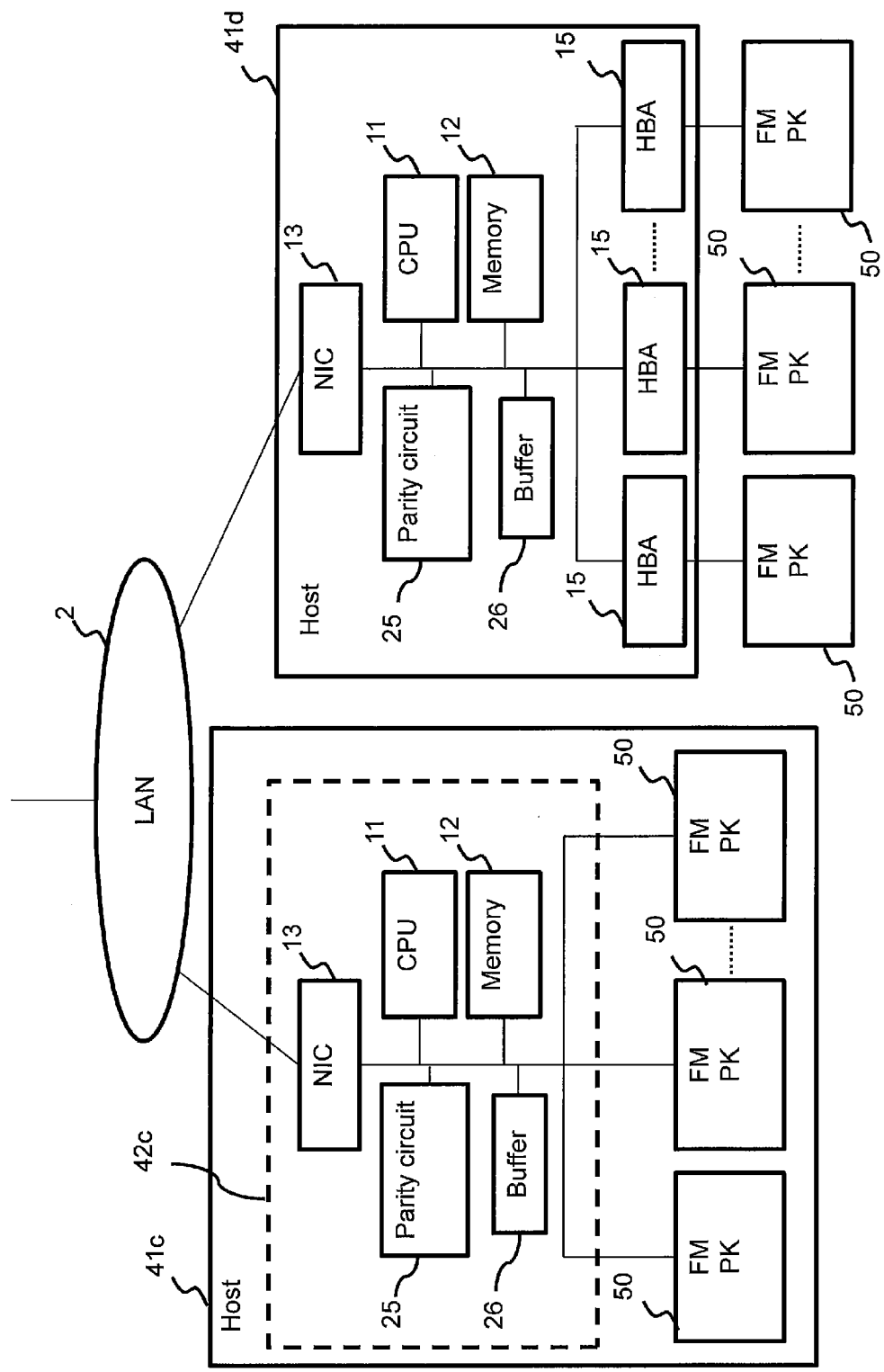
FIG. 45 shows an example of the configuration of a computer system related to Example 4.

FIG. 45 shows an example of the configuration of a computer system related to Example 4. In the computer system of this example, an element, which has been assigned the same reference sign as an element of the computer system of Example 3, denotes either the same or an equivalent element as the element of the computer system of Example 3. The computer system of this example comprises a host computer 41c, a host computer 41d, and multiple FMPKs 50 coupled to the host computer 41d. The host computer 41c and the host computer 41d, for example, are coupled via a communication network, for example, a LAN 2.

The host computer 41c comprises a host controller 42c, and multiple FMPKs 50 coupled to the host controller 42c. The host controller 42c, in addition to the elements of the host controller 42a, comprises a parity circuit 25.

The host computer 41d, in addition to the elements of the host computer 41b, comprises a parity circuit 25.

In the host controller 42c and the host computer 41d, the memory 12 stores a program and various types of information for controlling the FMPK 50. The CPU 11 realizes various types of functions in accordance with executing the program based on the information stored in the memory 12. Each of the host controller 42c and the host computer 41d may perform RAID control using the multiple FMPKs 50 coupled to itself.

One of the host controller 42c or the host computer 41d may carry out an IO request to the other via the LAN 2, or may carry out an IO request to the device controller 60 of its own FMPK 50.

Each of the host controller 42a and the host computer 41b correspond to either case #1 or case #2 of the method 1300 for deciding the parity operation implementation apparatus.

In this example, the system controller 20 may be an aspect of either of the host controller 42c or the host computer 41d.

The computer system may be a combination of the elements of any of the examples described hereinabove. A system controller 20, which comprises a parity operation function, and a system controller 20, which does not comprise a parity operation function, may co-exist in a single computer system.

According to the respective examples described hereinabove, the transfer of data between the system controller 20 and the device controller 60 can be held in check. This makes it possible to enhance the speed of the storage system 30. A data transfer, for example, is expressed as a number of data transfers, or as an amount of data transferred.

According to the respective examples described hereinabove, in addition to holding down the transfer of data between the system controller 20 and the device controller 60, the present invention can also reduce the amount of volatile memory that is used in the device controller 60.

The sequence of the respective processes in the operation of the system controller 20 may be switched. For example, 1402 and 1403 can be switched. The sequence of the respective processes in the operation of the device controller 60 may also be switched. For example, 3703 and 3704 can be switched.

REFERENCE SIGNS LIST

10 Host computer
20 System controller
25 Parity circuit
26 Buffer
30 Storage system
41a, 41b, 41c, 41d Host computer
42a, 42c Host controller
50 FMPK (Flash memory package)
55 FM (Flash memory)
60 Device controller
65 Parity circuit
66 Buffer

The invention claimed is:

1. A system comprising:
a plurality of storage devices, each of which includes one or more flash memory chips and a device controller coupled to the flash memory chips, and the plurality of storage devices include a first storage device storing old data and a second storage device storing old parity corresponding to the old data; and
a processor coupled to the storage devices,
wherein:
a first device controller in the first storage device is configured to generate intermediate parity based on the old data and new data, while the first device controller maintains a valid status of the new data and the old data,
the processor is configured to send the intermediate parity in accordance with issuing a parity-update-write command to the second storage device,
a second device controller in the second storage device is configured to receive the intermediate parity and to generate new parity based on the old parity and the intermediate parity,
the processor is configured to issue an unmap-old-data command for invalidating the old data to the first storage device when a completion response regarding the parity-update write command is received from the second storage device, and
the first device controller in the first storage device is configured to invalidate the old data when the unmap-old-data command is received from the processor.

2. A system according to claim 1, wherein the first device controller is configured to delete the old data after receiving the unmap-old-data command.

3. A system according to claim 1, wherein, when the processor does not receive the completion response from the second storage device within a prescribed period of time after issuing the parity-update-write command, the processor is configured to acquire the intermediate parity from the first storage device and re-send the intermediate parity to the second storage device.

4. A system according to claim 1, wherein the processor is configured to control the plurality of storage devices as a RAID group.

5. A system according to claim 1, wherein the first device controller includes a corresponding processor connected to a corresponding memory which stores instructions that, when executed on the corresponding processor, cause the corresponding processor to:
generate the intermediate parity based on the old data and new data, while maintaining the valid status of the new data and the old data, and
invalidate the old data when the unmap-old-data command is received.

6. A system according to claim 1, wherein the second device controller includes a corresponding processor connected to a corresponding memory which stores instructions that, when executed on the corresponding processor, cause the corresponding processor to:
receive the intermediate parity,
generate the new parity based on the old parity and the intermediate parity, and
send the completion response.

7. A system according to claim 1, wherein the processor is connected to a memory which stores instructions that, when executed on the processor, cause the processor to:
send the intermediate parity in accordance with issuing the parity-update-write command to the second storage device, and
issue the unmap-old-data command for invalidating the old data when the completion response regarding the parity-update write command is received from the second storage device.

8. A system comprising:
a plurality of storage devices, each of which includes one or more flash memory chips and a device controller coupled to the flash memory chips, and the plurality of storage devices include a first storage device storing old data and a second storage device storing old parity corresponding to the old data; and
a processor coupled to the storage devices,
wherein:
a first device controller in the first storage device is configured to generate intermediate parity based on the old data and new data, while the first device controller maintains a valid status of the new data and the old data,
the processor is configured to send the intermediate parity to the second storage device,
a second device controller in the second storage device is configured to receive the intermediate parity and to generate new parity based on the old parity and the intermediate parity,
the processor is configured to issue an unmap-old-data command for invalidating the old data when a completion response regarding the new parity is received from the second storage device, the first device controller in the first storage device is configured to invalidate the old data when the unmap-old-data command is received from the processor after recognizing that the new parity is generated.

9. A system according to claim 8, wherein the first device controller is configured to delete the old data after receiving the unmap-old-data command.

10. A system according to claim 8, wherein, when the processor does not receive the completion response from the second storage device within a prescribed period of time following the transfer of the intermediate parity, the processor is configured to acquire the intermediate parity from the first storage device and re-send the intermediate parity to the second storage device.

11. A system according to claim 8, wherein the processor is configured to control the plurality of storage devices as a RAID group.

12. A system according to claim 8, wherein the first device controller includes a corresponding processor connected to a corresponding memory which stores instructions that, when executed on the corresponding processor, cause the corresponding processor to:

generate intermediate parity based on the old data and new data, while maintaining the valid status of the new data and the old data, and invalidate the old data when the unmap-old-data command is received from the processor after recognizing that the new parity is generated.

13. A system according to claim 8, wherein the second device controller includes a corresponding processor connected to a corresponding memory which stores instructions that, when executed on the corresponding processor, cause the corresponding processor to:

receive the intermediate parity, generate the new parity based on the old parity and the intermediate parity, and send the completion response.

14. A system according to claim 8, wherein the processor is connected to a memory which stores instructions that, when executed on the processor, cause the processor to:

send the intermediate parity to the second storage device, and issue the unmap-old-data command for invalidating the old data when the completion response regarding the new parity is received from the second storage device.

15. A system according to claim 1, wherein the processor receives a write command including the new data, the first device controller receives an old-data-store command including the new data, and the old data is maintained as the valid status until after the processor receives the completion response regarding the parity-update write command.

* * * * *